US009983782B2

(12) United States Patent
Miyazawa et al.

(10) Patent No.: US 9,983,782 B2
(45) Date of Patent: May 29, 2018

(54) DISPLAY CONTROL APPARATUS, DISPLAY CONTROL METHOD, AND DISPLAY CONTROL PROGRAM

(75) Inventors: Yusuke Miyazawa, Tokyo (JP); Fuminori Homma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 132 days.

(21) Appl. No.: 12/980,592

(22) Filed: Dec. 29, 2010

(65) Prior Publication Data
US 2011/0164060 A1 Jul. 7, 2011

(30) Foreign Application Priority Data

Jan. 7, 2010 (JP) .............................. P2010-002132

(51) Int. Cl.
*G09G 5/00* (2006.01)
*G06F 3/0488* (2013.01)
*G06F 1/16* (2006.01)

(52) U.S. Cl.
CPC ........ *G06F 3/04883* (2013.01); *G06F 1/1643* (2013.01); *G06F 1/1647* (2013.01); *G06F 3/0488* (2013.01); *G06F 2203/04806* (2013.01); *G06F 2203/04808* (2013.01)

(58) Field of Classification Search
CPC .... G06F 3/0481; G06F 3/0485; G06F 3/0486; G06F 3/04855; G06T 3/40
USPC ......... 345/173–175, 660, 671; 715/788, 800, 715/863
See application file for complete search history.

(56) References Cited

U.S. PATENT DOCUMENTS

| | | | | |
|---|---|---|---|---|
| 6,943,778 | B1* | 9/2005 | Astala et al. | 345/173 |
| 7,274,381 | B2* | 9/2007 | Mojaver et al. | 345/647 |
| 7,469,381 | B2* | 12/2008 | Ording | 715/702 |
| 2006/0187214 | A1* | 8/2006 | Gillespie et al. | 345/173 |
| 2007/0097109 | A1* | 5/2007 | Shoemaker et al. | 345/418 |
| 2009/0040238 | A1* | 2/2009 | Ito | G06F 3/0481 345/660 |
| 2009/0066660 | A1* | 3/2009 | Ure | 345/173 |
| 2009/0303352 | A1* | 12/2009 | Fujinawa | H04N 1/00442 348/231.99 |
| 2010/0079374 | A1* | 4/2010 | Cortenraad et al. | 345/158 |
| 2010/0171712 | A1* | 7/2010 | Cieplinski | G06F 3/04883 345/173 |
| 2010/0302281 | A1* | 12/2010 | Kim | 345/661 |
| 2010/0315438 | A1* | 12/2010 | Horodezky et al. | 345/661 |
| 2011/0013049 | A1* | 1/2011 | Thorn | 348/240.3 |
| 2011/0029917 | A1* | 2/2011 | Um | 715/800 |
| 2011/0157028 | A1* | 6/2011 | Stallings et al. | 345/173 |

FOREIGN PATENT DOCUMENTS

JP 2009-116583 5/2009

* cited by examiner

*Primary Examiner* — Todd Buttram
(74) *Attorney, Agent, or Firm* — Paratus Law Group, PLLC

(57) ABSTRACT

A display control apparatus includes: a display section; a detecting section which detects an indication manipulation for a manipulation surface; and a control section which detects, if the indication manipulation for the manipulation surface is detected by the detecting section, an area in the manipulation surface indicated through the indication manipulation, and enlarges an image on the basis of the detected area to be displayed on the display section.

17 Claims, 21 Drawing Sheets

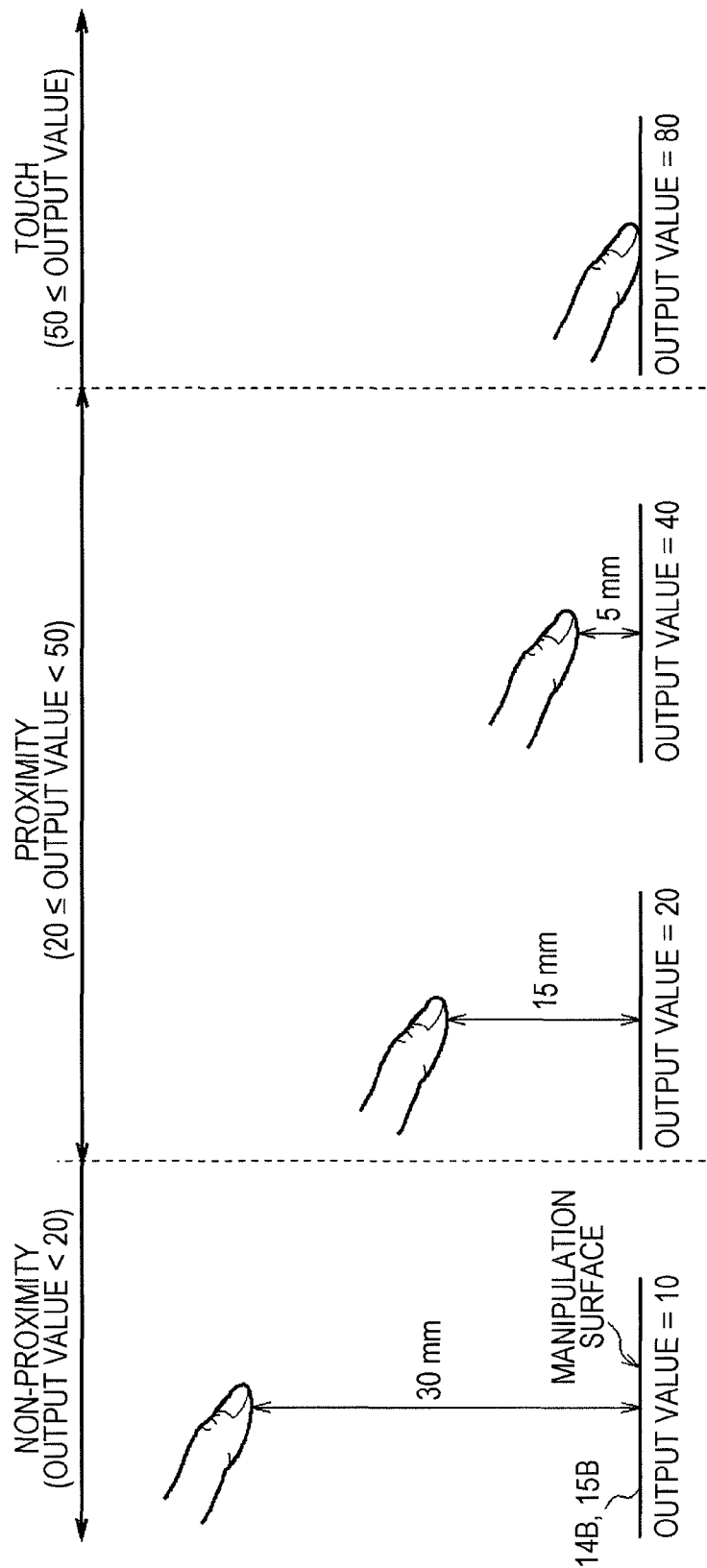

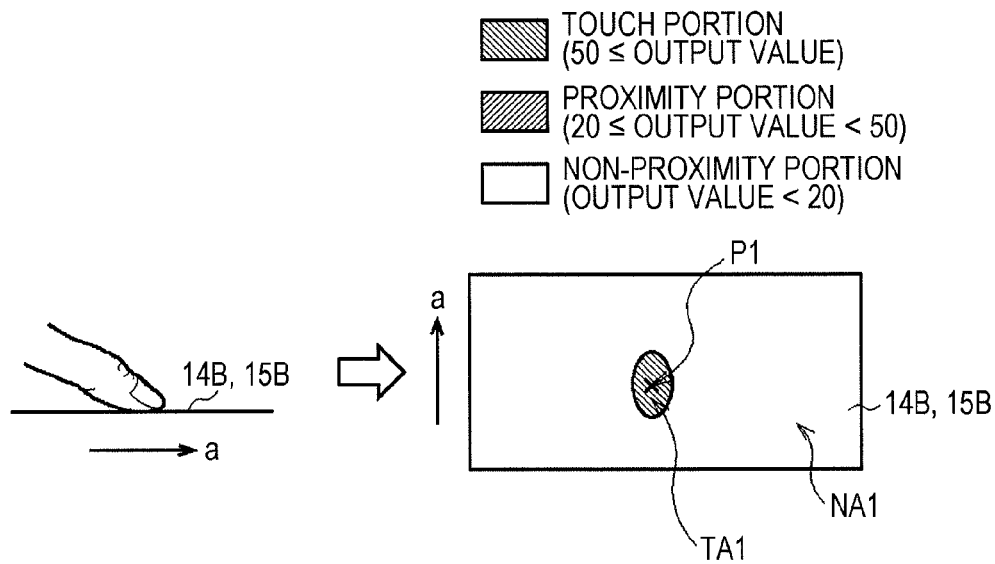
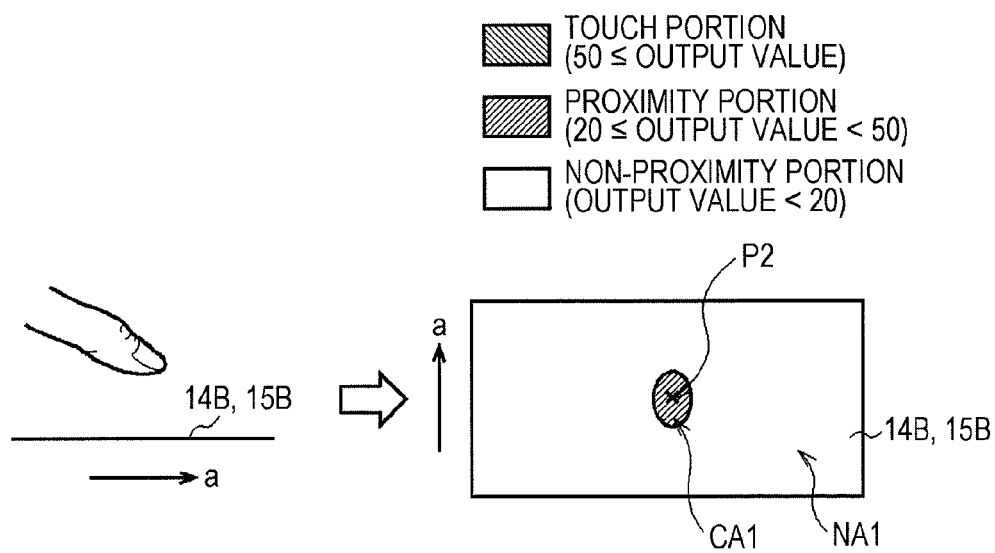

FIG. 7
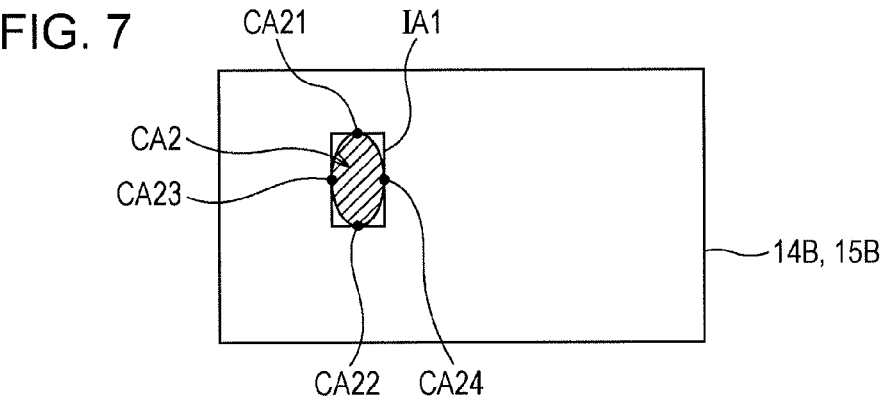
FIG. 8
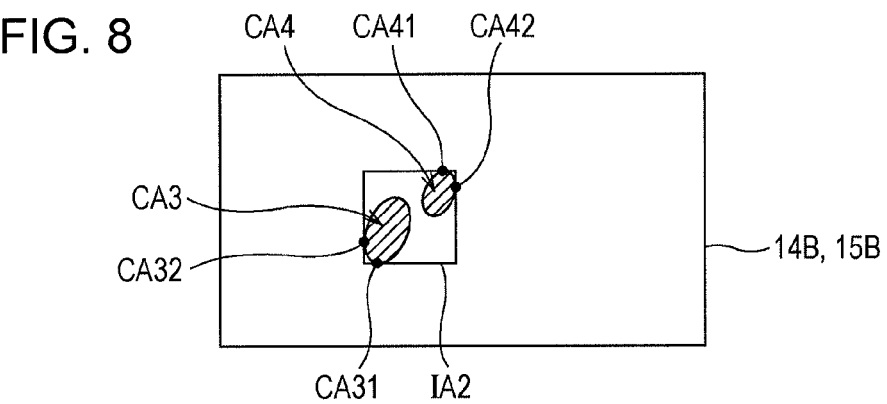
FIG. 9
| AREA INFORMATION | ENLARGEMENT TARGET PORTION INFORMATION | ENLARGEMENT RATIO INFORMATION |
|---|---|---|
| AREA 1 | FRAME 1 | ENLARGEMENT RATIO 1 |
| AREA 2 | FRAME 2 | ENLARGEMENT RATIO 2 |
| AREA 3 | FRAME 3 | ENLARGEMENT RATIO 3 |
| ⋮ | ⋮ | ⋮ |
| AREA N | FRAME N | ENLARGEMENT RATIO N |

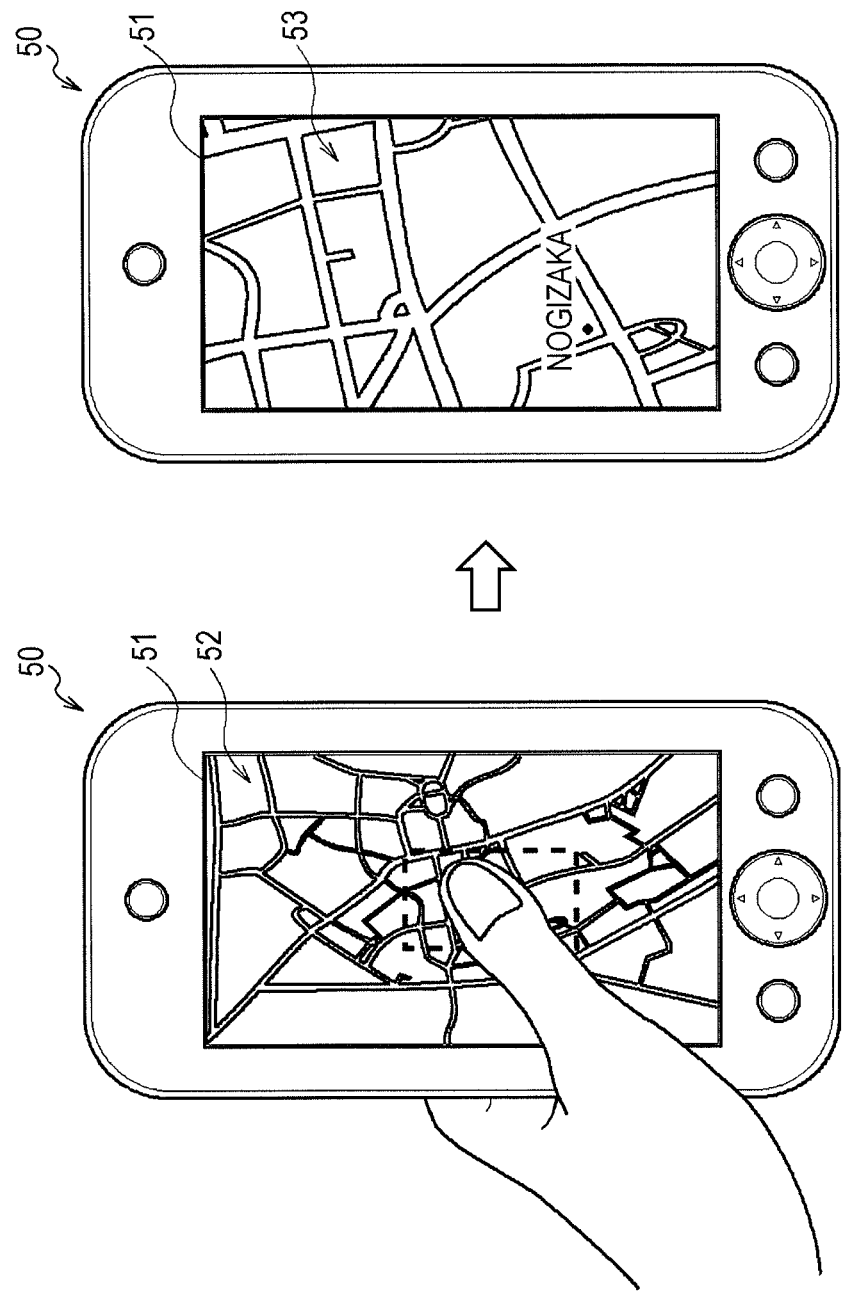

DISPLAY CONTROL APPARATUS, DISPLAY CONTROL METHOD, AND DISPLAY CONTROL PROGRAM

BACKGROUND OF THE INVENTION

1. Field of the Invention

The present invention relates to a display control apparatus, a display control method and a display control program which are appropriately applied to a mobile terminal having a touch panel installed in it, for example.

2. Description of the Related Art

In the related art, an electronic device has an electrostatic capacitive touch sensor installed in a front area of a display section, for example. The electronic device detects the presence or absence of touch or proximity of manipulation indication means (a finger or a stylus or the like) to the touch sensor according to change in electrostatic capacitance of the touch sensor.

Further, the electronic device detects distance between the touch sensor and the manipulation indication means on the basis of the change in the electrostatic capacitance of the touch sensor if the manipulation indication means moves close to the touch sensor in a state where a plurality of indication items is displayed in the display section.

Further, when the manipulation indication means is close to the touch sensor by a first distance, the electronic device calculates the position of the manipulation indication means over the touch sensor on the basis of the first distance, and selects an indication item which is closest to the manipulation indication means on the basis of the calculation result.

Then, if the distance between the touch sensor and the manipulation indication means becomes a second distance shorter than the first distance, the electronic device enlarges the selected indication item and displays it on a full screen of the display section.

In this state, if the manipulation indication means is in touch with the touch sensor, the electronic device recognizes that a command corresponding to the enlarged and displayed indication item is input.

In this way, the electronic device allows the indication item displayed on the display section to be easily indicated and allows the command corresponding to the indication item to be easily input (for example, refer to Japanese Unexamined Patent Application Publication No. 2009-116583, pp 7-9, FIGS. 4 and 5).

SUMMARY OF THE INVENTION

However, in the electronic device having such a configuration, as described above, any indication item in an image is enlarged at a predetermined single enlargement ratio and displayed on the display section, according to the manipulation for the touch sensor.

Thus, in a case where a desired portion is enlarged and displayed regardless of whether the indication item of the image is present or absent on the display section, and the image is desired to be enlarged at a desired enlargement ratio to be displayed, it is difficult to enlarge and display the image in accordance with such a desire, thereby lowering usability.

Accordingly, it is desirable to provide a display control apparatus, a display control method and a display control program which can enhance usability.

According to an embodiment of the present invention, there are provided a display control apparatus, a display control method and a display control program in which if an indication manipulation for a manipulation surface is detected, an area in the manipulation surface indicated through the indication manipulation is detected, and an image is enlarged on the basis of the detected area to be displayed on a display section.

According to the embodiment, it is possible to easily select an enlargement target portion of the image or the enlargement ratio by performing the indication manipulation so as to indicate a desired part of the manipulation surface or an area having a desired size. As a result, according to the embodiment, it is possible to enlarge a desired enlargement target portion of image to be displayed on the display section, and to enlarge at least one part of the image at a desired enlargement ratio to be displayed.

According to the embodiment of the present invention, it is possible to realize a display control apparatus, a display control method and a display control program in which if the indication manipulation for the manipulation surface is detected, the area in the manipulation surface indicated through the indication manipulation is detected, and the image is enlarged on the basis of the detected area to be displayed on the display section, and accordingly, the enlargement target portion of the image or the enlargement ratio can be easily selected by performing the indication manipulation so as to indicate the desired part of the manipulation surface or the area having the desired size, and as a result, the desired enlargement target portion of the image can be enlarged to be displayed on the display section, and at least one part of the image can be enlarged at the desired enlargement ratio to be displayed, thereby enhancing usability.

BRIEF DESCRIPTION OF THE DRAWINGS

FIG. 4 is a diagram schematically illustrating change in output values of an electrostatic sensor according to change in distance between a manipulation body and a manipulation surface;

FIGS. 5A and 5B are diagrams schematically illustrating detection of a touch area, a proximity area, and a non-proximity area;

FIG. 7 is a diagram schematically illustrating detection of an indication region in a case where the number of proximity areas due to a continuous proximity manipulation is one;

FIG. 8 is a diagram schematically illustrating detection of an indication region in a case where there are a plurality of proximity areas due to a continuous proximity manipulation;

FIG. 9 is a diagram schematically illustrating a configuration of a detection table;

FIG. 23 is a diagram schematically illustrating a modified embodiment of a mobile terminal.

DESCRIPTION OF THE PREFERRED EMBODIMENTS

Hereinafter, preferred exemplary embodiments for carrying out the present invention will be described with reference to the accompanying drawings. The description will be made in the following order:
1. Embodiment
2. Modified embodiments
1. Embodiment
[1-1. Outline of Embodiment]

Firstly, an outline of an embodiment will be described. That is, after description of the outline, a specific example according to the present embodiment will be described.

Figure 1:
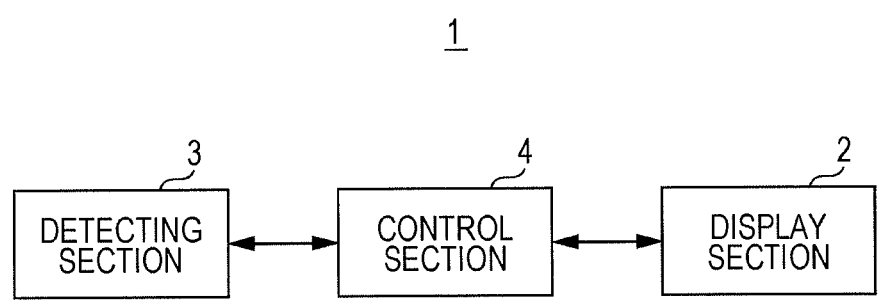
FIG. 1 is a block diagram illustrating an embodiment of a circuit configuration of a display control apparatus according to the present invention.

In FIG. 1, reference numeral 1 generally represents a display control apparatus according to an embodiment. A display section 2 in the display control apparatus 1 displays an image.

Further, a detecting section 3 in the display control apparatus 1 detects an indication manipulation for a manipulation surface. Further, if the indication manipulation for the manipulation surface is detected by the detecting section 3, a control section 4 in the display control apparatus 1 detects the area in the manipulation surface indicated by the indication manipulation, and enlarges an image on the basis of the detected area to be displayed on the display section 2.

With such a configuration, the display control section 1 can easily select the enlargement target portion or the enlargement ratio of the image by performing the indication manipulation so as to indicate a desired portion of the manipulation surface or an area of a desired size.

As a result, the display control section 1 can enlarge the desired enlargement target portion of the image to be displayed on the display section 2, and can enlarge at least part of the image at a desired enlargement ratio to be displayed. Thus, the display control apparatus 1 can enhance usability.

[1-2. Specific Example According to Embodiment]
[1-2-1. External Configuration of Mobile Terminal]

Figure 2:
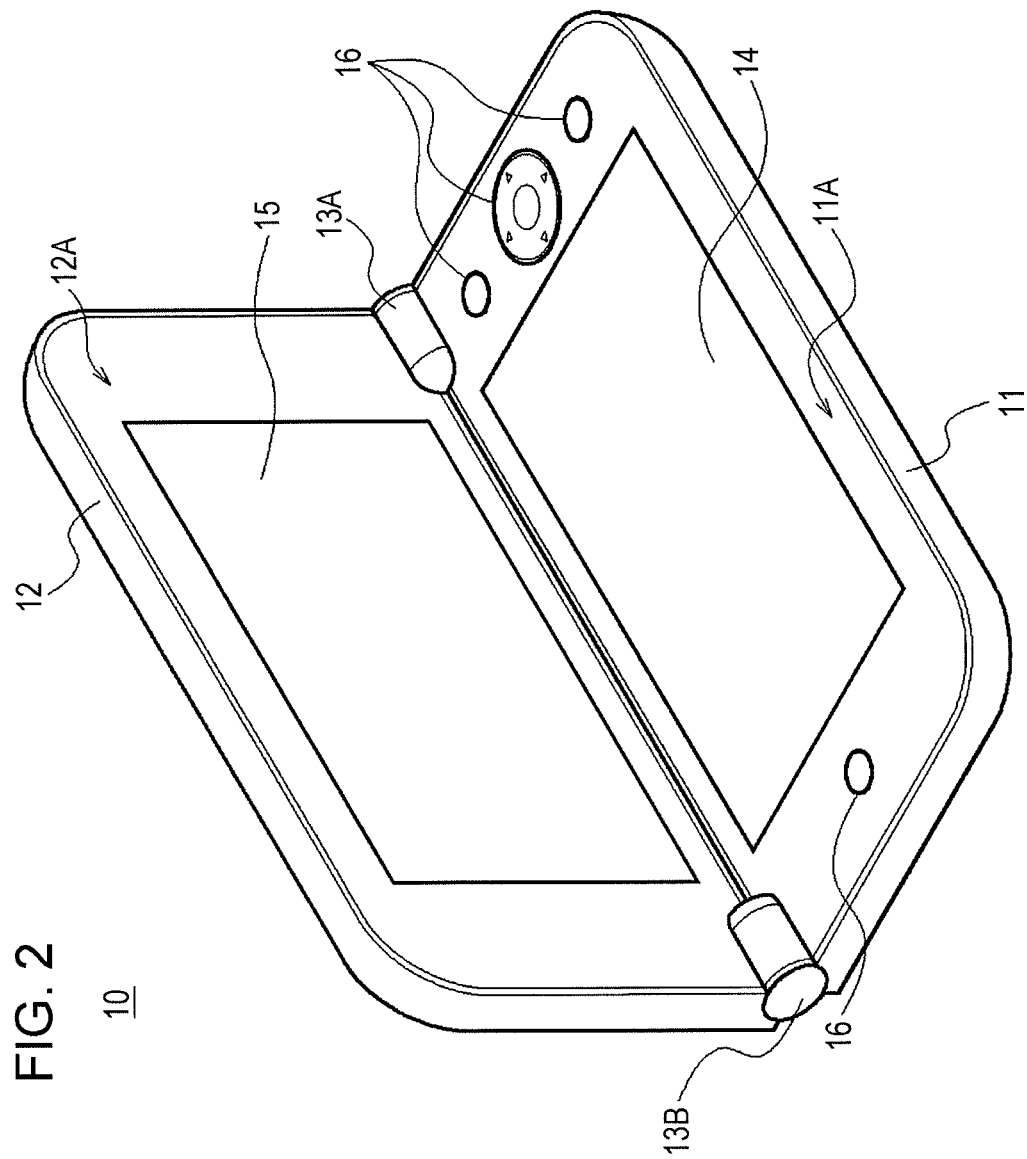
FIG. 2 is a diagram schematically illustrating an embodiment of an external configuration of a mobile terminal.

Next, an external configuration of a mobile terminal 10 which is a specific example of the above-described display control apparatus 1 will be described with reference to FIG. 2. The mobile terminal 10 has a configuration in which a first casing 11 and a second casing 12 which are approximately flat and rectangular are connected with each other through hinge sections 13A and 13B to be able to be opened or closed, and has a size such as to be gripped with one hand as a whole.

In the mid portion of a front surface 11A of the first casing 11 is installed a first touch screen 14 of a rectangular shape. Further, in the mid portion of a front surface 12A of the second casing 12 is installed a second touch screen 15 having the same shape and the same size as the first touch screen 14.

The first touch screen 14 includes a first liquid crystal display panel, and a first touch panel of an electrostatic capacitance type which is arranged to cover a display surface of the first liquid crystal display panel.

Further, the first touch panel has a transparent thin sheet shape, so that an image displayed on the display surface of the first liquid crystal display panel can be seen from a front side of the first touch screen 14.

In a similar way to the first touch screen 14, the second touch screen 15 includes a second liquid crystal display panel, and a second touch panel of an electrostatic capacitance type which is arranged to cover a display surface of the second liquid crystal display panel.

Further, in a similar way to the first touch panel, the second touch panel has a transparent thin sheet shape, so that an image displayed on the display surface of the second liquid crystal display panel can be seen from a front side of the second touch screen 15.

Further, in the first touch panel and the second touch panel, a touch manipulation and a proximity manipulation are performed by a manipulation body including a finger of a user or a conductor such as a touch pen made of metal which is used by the user or the like, with respect to their manipulation surfaces.

Hereinafter, the manipulation surface of the first touch panel is referred to as "first manipulation surface", and the manipulation surface of the second touch panel is referred to as "second manipulation surface".

Here, the touch manipulation is a manipulation performed by bringing the manipulation body in touch with the first manipulation surface of the first touch panel or the second manipulation surface of the second touch panel (hereinafter, referred to as "touch manipulation").

Further, the proximity manipulation is a manipulation performed by moving the manipulation body close to the first manipulation surface or the second manipulation surface, without being in touch with the first manipulation surface of the first touch panel or the second manipulation surface of the second touch panel. The first touch panel and the second touch panel correspond to a multi-touch panel.

Thus, the mobile terminal 10 receives the touch manipulation and the proximity manipulation by means of the manipulation body for the surfaces of the first touch screen 14 and the second touch screen 15 (that is, the first manipulation surface and the second manipulation surface) as a manipulation input.

Further, the mobile terminal 10 is generally used in a posture in which the front surface 11A of the first casing 11 is positioned below the eyeline of the user and the front surface 12A of the second casing 12 is positioned above the eyeline of the user.

Accordingly, the mobile terminal 10 uses the first touch screen 14 as a lower screen, and uses the second touch screen 15 as an upper screen, according to such a general usage posture, to thereby display a variety of images on these screens (display surfaces of the first liquid crystal display panel and the second liquid crystal display panel).

Further, on the front surface 11A of the first casing 11 of the mobile terminal 10, a variety of manipulation buttons 16 such as a power button or the like are also installed at sides of the first touch screen 14.

Hereinafter, on a display surface of the first liquid crystal display panel 14A and the first manipulation surface of the first touch panel 14B, the side of the hinge sections 13A and 13B which is one vertical direction side of a screen is referred to as "up", and the other vertical direction side of the screen is referred to as "down".

Further, hereinafter, on the display surface of the first liquid crystal display panel 14A and the first manipulation surface of the first touch panel 14B, one horizontal direction side of the screen is referred to as "left", and the other horizontal direction side of the screen is referred to as "right".

On the other hand, hereinafter, on a display surface of the second liquid crystal display panel 15A and the second manipulation surface of a second touch panel 15B, one vertical direction side of the screen is referred to as "up", and the side of the hinge sections 13A and 13B which is one vertical direction side of the screen is referred to as "down".

Further, hereinafter, on the display surface of the second liquid crystal display panel 15A and the second manipulation surface of the second touch panel 15B, one horizontal direction side of the screen is referred to as "left", and the other horizontal direction side of the screen is referred to as "right".

[1-2-2. Hardware Configuration of Mobile Terminal]

Figure 3:
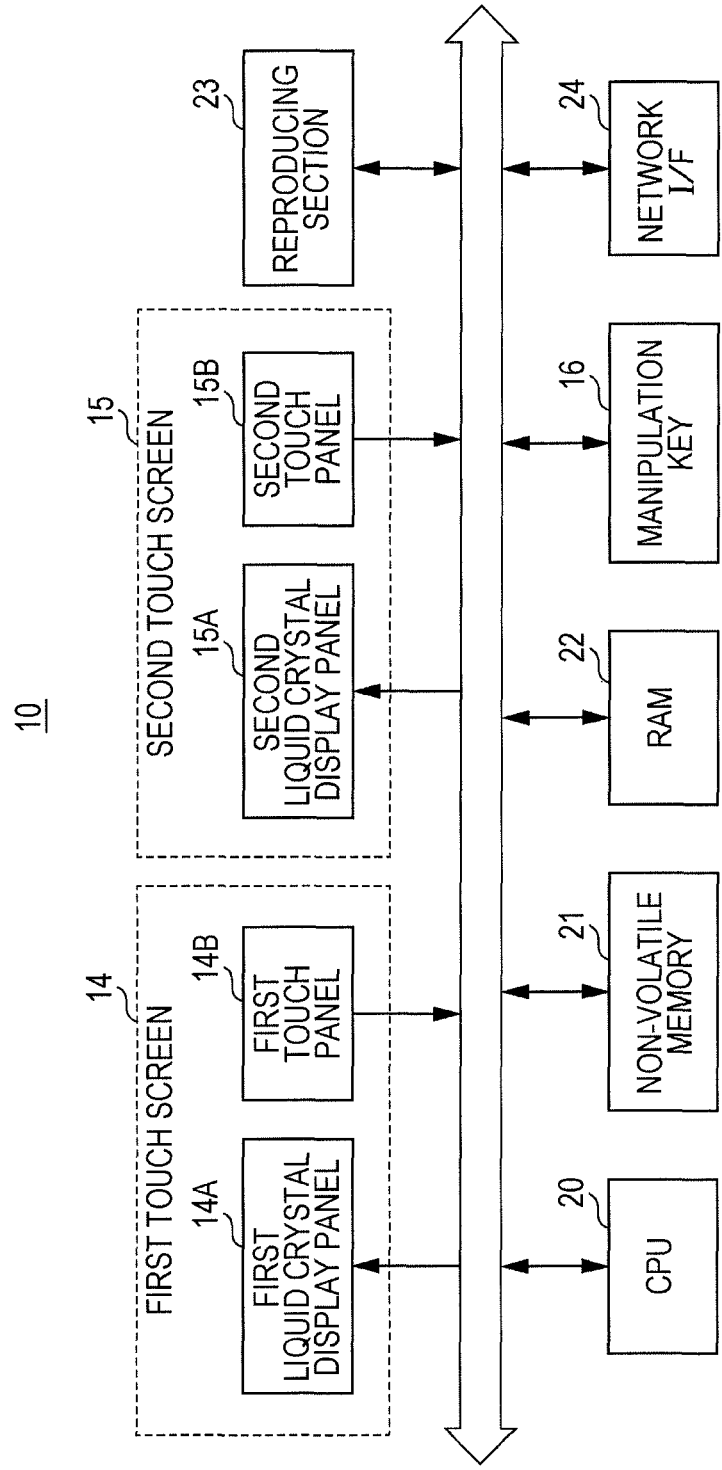
FIG. 3 is a block diagram illustrating a circuit configuration based on a hardware circuit block of a mobile terminal.

Next, a hardware configuration of the mobile terminal 10 will be described with reference to FIG. 3. A control section 20 including a CPU (central processing unit) is installed in the mobile terminal 10.

The control section 20 reads out a program stored in a non-volatile memory 21 in advance from the non-volatile memory 21 and expands it to a RAM (random access memory) 22. Further, the control section 20 performs a variety of processes according to the program and controls the respective sections.

Thus, the control section 20 detects whether the touch manipulation or the proximity manipulation is performed for the surfaces of the first touch screen 14 and the second touch screen 15.

Further, if it is detected that the touch manipulation or the proximity manipulation is performed for the surfaces of the first touch screen 14 and the second touch screen 15, the control section 20 detects a command or instruction which is input according to the touch manipulation or the proximity manipulation, and performs a process according to the command or instruction.

In practice, as described above, the first touch screen 14 includes the first liquid crystal display panel 14A which displays an image and the first touch panel 14B of the electrostatic capacitance type.

The first touch panel 14B has, for example, a plurality of electrostatic sensors (not shown) which is arranged in a matrix form at an inner side of the first manipulation surface, which faces a plurality of pixels of the first liquid crystal display panel 14A.

In the plurality of electrostatic sensors, if a manipulation body each being made of a conductor moves close thereto, electrostatic capacitances thereof are changed, and output values are also changed according to the change in the electrostatic capacitances.

For example, as shown in FIG. 4, if a fingertip which is an example of the manipulation body moves close to the first manipulation surface of the first touch panel 14B by a distance of 30 [mm], an output value of the electrostatic sensor which is positioned directly under the fingertip in the first manipulation surface becomes "10".

Further, for example, if the fingertip which is the manipulation body moves close to the first manipulation surface of the first touch panel 14B by a distance of 15 [mm], an output value of the electrostatic sensor which is positioned directly under the fingertip in the first manipulation surface becomes "20".

Furthermore, for example, if the fingertip which is the manipulation body moves close to the first manipulation surface of the first touch panel 14B by a distance of 5 [mm], an output value of the electrostatic sensor which is positioned directly under the fingertip in the first manipulation surface becomes "40".

In addition, for example, if the fingertip which is the manipulation body is in touch with the first manipulation surface of the first touch panel 14B, an output value of the electrostatic sensor which is positioned in a portion which is in touch with the fingertip in the first manipulation surface becomes a maximum of "80".

Accordingly, the control section 20 performs an area detection process at a predetermined time interval such as several [msec] or several [μsec], which are significantly short.

When performing the area detection process, the control section 20 acquires an output value of each electrostatic sensor from the first touch panel 14B and positional information indicating an arrangement position of the electrostatic sensor, as a panel output signal.

The arrangement position of the electrostatic sensor is represented by coordinates (that is, two-dimensional coordinates indicating a position where a pixel facing the electrostatic sensor is arranged in the first liquid crystal display panel 14A) of a pixel position of the first liquid crystal display panel 14A facing the electrostatic sensor, for example.

Further, as shown in FIGS. 5A and 5B, the control section 20 sequentially compares an output value of each electrostatic sensor included in the panel output signal with a preset first threshold value, for example, "50" and a preset second threshold value, for example, "20".

Further, the control section 20 detects one or plural areas TA1 in which the electrostatic sensors which obtain the output values which are equal to or higher than the first threshold value are collected on the first manipulation surface, as the area or areas TA1 with which the manipulation body is in touch, respectively, on the basis of the comparison result and the positional information included in the panel output signal.

Hereinafter, on the first manipulation surface of the first touch panel 14B and the second manipulation surface of the second touch panel 15B, the one or plural areas TA1 with which the manipulation body is in touch are referred to as "the touch area or areas TA1", respectively.

In practice, the control section 20 detects one or plural touch areas TA1 on the first manipulation surface as coordinates of pixel positions facing the electrostatic sensors which obtain output values equal to or higher than the first threshold value, respectively.

If one or plural touch areas TA1 are detected in this way, the control section 20 detects, for example, each center position P1 of the detected one or plural touch areas TA1 as the coordinates of the facing pixel positions.

Further, at this time, the control section 20 detects one or plural areas CA1 in which the electrostatic sensors which obtain output values which are equal to or higher than the second threshold value and are lower than the first threshold value are collected on the first manipulation surface, as the area or areas CA1 which become shaded as the manipulation body moves close thereto, respectively, on the basis of the comparison result and the positional information.

Further, hereinafter, on the first manipulation surface or the second manipulation surface, one or plural areas CA1 which becomes shaded as the manipulation body moves close thereto (that is, one or plural areas CA1 in which a proximity portion of the manipulation body is projected on the first manipulation surface or the second manipulation surface) is referred to as "proximity area or areas CA1", respectively.

Further, hereinafter, a range of the distance to the manipulation body from the first manipulation surface or the second manipulation surface, in which the proximity area CA1 can be detected in which the output values of the electrostatic sensors are equal to or higher than the second threshold value and are lower than the first threshold value, is referred to as "proximity detection distance range".

In practice, the control section 20 detects one or plural touch areas TA1 on the first manipulation surface as the coordinates of the pixel positions facing the electrostatic sensors which obtain the output values which are equal to or higher than the second threshold value and are lower than the first threshold value, respectively.

Even when one or plural proximity areas CA1 are detected in this way, the control section 20 also detects, for example, each center position P2 of the detected one or plural proximity areas CA1, as the coordinates of the facing pixel positions.

However, in a case where the touch manipulation is performed on the first manipulation surface of the first touch panel 14B, only the tip section of the manipulation body may be in touch with the first manipulation surface in a state where the manipulation body such as a finger is obliquely inclined.

In this case, in the first touch panel 14B, an output value of the electrostatic sensor which is disposed in the touching portion of the manipulation body on the first manipulation surface becomes a maximum of "80", as described above.

Further, in the first touch panel 14B, an output value of the electrostatic sensor which is disposed in the portion which becomes shaded by the manipulation body (non-touching portion which is directly under the manipulation body) on the first manipulation surface decreases as it becomes distant from the touching portion of the manipulation body, for example.

Thus, when simply using comparison results between the output value of the electrostatic sensor and the first and second threshold values, the control section 20 detects, within the portion which becomes shaded by the manipulation body of which the tip section is in touch with the first manipulation surface, the tip section and the touching portion of the tip section as the touch area TA1.

Further, at this time, the control section 20 may detect a part which is spaced away from the tip section within the portion which becomes shaded by the manipulation body of which the tip section is in touch with the first manipulation surface, as the proximity area CA1 which is connected to the touch area TA1, according to the angle of the manipulation body with respect to the first manipulation surface.

Here, the control section 20 employs the touch manipulation and the proximity manipulation as a manipulation for inputting different commands or for performing different instructions, and detects the touch area TA1 or the proximity area CA1 in order to individually detect that the touch manipulation or the proximity manipulation is performed.

Thus, if the touch area TA1 and the proximity area CA1 which is connected to the touch area TA1 are simultaneously detected, the control section 20 validates only the detection of one touch area TA1 and negates the detection of the other proximity area CA1 on the basis of the comparison results between the output value of the electrostatic sensor and the first and second threshold values.

That is, if the touch area TA1 and the proximity area CA1 which is connected to the touch area TA1 are simultaneously detected, the control section 20 determines that the touch area TA1 through the touch manipulation performed on the first manipulation surface is detected and cancels the detection of the proximity area CA1 as a false detection.

Thus, when the touch manipulation is performed on the first manipulation surface, the control section 20 prevents a false operation (that is, performing a false process) due to the false determination that the proximity area CA1 is detected and the proximity manipulation is performed.

Further, at this time, the control section 20 detects one or plural areas NA1 in which the electrostatic sensors which obtain output values lower than the second threshold value are collected on the first manipulation surface, as the area or areas NA1 which the manipulation body is neither in touch with nor moves close to, on the basis of the comparison result and the positional information, respectively.

Hereinafter, on the first manipulation surface of the first touch panel 14B or the second manipulation surface of the second touch panel 15B, one or plural areas NA1 which the manipulation body is neither in touch with nor moves close to are referred to as "non-proximity area or areas NA1", respectively.

Further, at this time, the control section 20 detects one or plural non-proximity areas NA1 on the first manipulation surface as coordinates of pixel positions facing the electrostatic sensors which obtain output values lower than the second threshold value, respectively.

In this way, whenever performing the area detection process, the control section 20 performs the detection so that one or plural touch areas TA1, one or plural proximity areas CA1, or one or plural non-proximity areas NA1 are distinguished from each other on the first manipulation surface of the first touch panel 14B.

Further, the control section 20 may recognize whether the manipulation body is in touch with or moves close to the first manipulation surface, by performing the detection so that the touch area TA1, the proximity area CA1 and the non-proximity area NA1 are distinguished from each other on the first manipulation surface of the first touch panel 14B.

Further, at this time, the control section 20 may recognize which position the manipulation body is in touch with or moves close to, on the first manipulation surface of the first touch panel 14B.

Furthermore, the control section 20 may recognize the shape or size of the touch area TA1 of the manipulation body on the first manipulation surface of the first touch panel 14B, the shape or size of the proximity area CA1 of the manipulation body for the first manipulation surface, or the like.

In this way, the control section 20 obtains the panel output signal from the first touch panel 14B at a predetermined time interval and detects the touch area TA1, the proximity area CA1 and the non-proximity area NA1 on the first manipulation surface, to thereby detect their transitions.

Further, the control section 20 specifies the movement of the manipulation body on the first manipulation surface of the first touch panel 14B on the basis of the transitions, and recognizes the touch manipulation and the proximity manipulation performed for the first manipulation surface on the basis of the specified movement of the manipulation body.

Further, the control section 20 detects a command which is input according to the recognized touch manipulation and proximity manipulation, and performs a process according to the command or instruction.

In this way, if the touch manipulation or the proximity manipulation is performed for the first manipulation surface of the first touch screen 14, the control section 20 receives it as a manipulation input, and performs a process according to the manipulation input.

On the other hand, the second touch screen 15 includes the second liquid crystal display panel 15A which displays an image, and the second touch panel 15B of the electrostatic capacitance type, as described above.

The second touch panel 15B is configured in a similar way to the first touch panel 14B, and has a plurality of electrostatic sensors (not shown) which are arranged at an inner side of the second manipulation surface in a matrix form, facing the plurality of pixels of the second liquid crystal display panel 15A, for example.

Further, in a plurality of electrostatic sensors of the second touch panel 15B, if the manipulation body each being made of a conductor moves close thereto, electrostatic capacitances thereof are changed in a similar way to the case of the plurality of electrostatic sensors in the first touch panel 14B, and output values are also changed according to the change in the electrostatic capacitances.

Thus, when performing the area detection process at a predetermined time interval, the control section 20 obtains an output value of each electrostatic sensor from the second touch panel 15B in a similar way to the case of the first touch panel 14B and positional information indicating the arrangement position of the electrostatic sensor, as a panel output signal.

For example, the arrangement position of the electrostatic sensor is indicated by coordinates of the pixel position of the second liquid crystal display panel 15A facing the electrostatic sensor (that is, two-dimensional coordinates indicating the position in which a pixel facing the electrostatic sensor is arranged in the second liquid crystal display panel 15A).

Further, if the panel output signal is obtained from the second touch panel 15B in the area detection process, the control section 20 appropriately detects one or plural touch areas or one or plural proximity areas and the center positions thereof on the second manipulation surface using the panel output signal.

Further, whenever the area detection process is performed, the control section 20 also detects one or plural non-proximity areas on the second manipulation surface of the second touch panel 15B.

That is, whenever the area detection process is performed, the control section 20 also performs the detection so that one or plural touch areas, one or plural proximity areas and one or plural non-proximity areas are distinguished from each other on the second manipulation surface of the second touch panel 15B.

Accordingly, the control section 20 may also recognize whether the manipulation body is in touch with or moves close to the second manipulation surface, on the second manipulation surface of the second touch panel 15B.

Further, at this time, the control section 20 may also recognize which position the manipulation body is in touch with or moves close to, on the second manipulation surface of the second touch panel 15B.

Furthermore, the control section 20 may also recognize the shape or size of the touch area of the manipulation body on the second manipulation surface of the second touch panel 15B, the shape or size of the proximity area of the manipulation body for the second manipulation surface, or the like.

The control section 20 obtains a panel output signal from the second touch panel 15B at a predetermined time interval in this way, and detects the touch area, the proximity area and the non-proximity area on the second manipulation surface, to thereby detect their transitions.

Further, the control section 20 specifies the movement of the manipulation body on the second manipulation surface of the second touch panel 15B on the basis of the transitions, and recognizes the touch manipulation and the proximity manipulation performed for the second manipulation surface on the basis of the specified movement of the manipulation body.

Further, the control section 20 detects the command or instruction which is input according to the recognized touch manipulation and proximity manipulation, and then performs the process according to the command or instruction.

In this way, if the touch manipulation or the proximity manipulation is performed for the second manipulation surface of the second touch screen 15, the control section 20 receives it as a manipulation input and performs a process according to the manipulation input.

However, as the touch manipulation performed on the first manipulation surface of the first touch panel 14B or the second manipulation surface of the second touch panel 15B, there is a manipulation in which one finger which is an example of the manipulation body is in touch with approximately one point of the first manipulation surface or the second manipulation surface and then is immediately disengaged therefrom.

Hereinafter, the manipulation in which one finger which is the manipulation body is in touch with the first manipulation surface or the second manipulation surface and then is immediately disengaged therefrom is referred to as "tap manipulation", in particular. The tap manipulation is, for example, performed to indicate indication items such as an icon, button or the like in an image.

Further, as the touch manipulation performed on the first manipulation surface of the first touch panel 14B or the second manipulation surface of the second touch panel 15B, for example, there is a manipulation in which one finger which is an example of the manipulation body is moved while being in touch with the first manipulation surface or the second manipulation surface.

Hereinafter, the manipulation in which one finger which is the manipulation body is moved while being in touch with the first manipulation surface or the second manipulation surface is referred to as "sliding manipulation", in particular. For example, the sliding manipulation is performed to scroll an image being displayed to change a displayed portion.

Accordingly, whenever the area detection process is performed, if the touch area and the center position thereof are detected on the basis of the panel output signal obtained from the first touch panel 14B, the control section 20 determines the type of the touch manipulation performed on the first manipulation surface on the basis of the series of detection results.

In practice, the control section 20 holds in advance maximum movement distance information indicating the maximum movement distance in which the manipulation body which performs the touch manipulation or the proximity manipulation is movable, at the above-described predetermined time which is a performance interval of the area detection process.

Further, if the panel output signal is obtained from the first touch panel 14B by performing the area detection process and one touch area and the center position thereof are detected, the control section 20 determines whether the touch area is detected in the previous (one time before) area detection process in each case.

As a result, if the touch area is not detected at all in the previous area detection process, the control section 20 determines that one touch area detected in a current area detection process is a touch area at the time when the touch of the manipulation body on the first manipulation surface is started.

On the other hand, if the touch area is detected in the previous area detection process, the control section 20 calculates the distance (hereinafter, referred to as "inter-center distance") between the center position detected in the previous area detection process and the center position detected in the current area detection process in a round-robin manner.

Further, the control section 20 compares the calculated one or plural inter-center distances with the maximum movement distance, respectively. Further, the control section 20 determines whether the center position within the maximum movement distance from the center position detected in the previous area detection process is detected in the current area detection process, on the basis of the comparison result.

As a result, if the center position within the maximum movement distance from the previous center position is detected in the current area detection process, the control section 20 determines that the previous and current touch areas corresponding to the previous and current center positions are the touch areas of the same manipulation body (for example, the same finger).

That is, if the center position within the maximum movement distance from the previous center position is detected in the current area detection process, the control section 20 determines that the touch area corresponding to the current center position is the touch area of the manipulation body which has been in touch with the first manipulation surface from the time of the previous area detection process.

Further, if a center position which is distant beyond the maximum movement distance from any previous center position is detected in the current area detection process, the control section 20 determines that the touch area corresponding to the current center position is a touch area at the time when a touch of a new (different) manipulation body is started on the first manipulation surface.

Further, if a center position in which the inter-center distance to any previous center position is equal to or smaller than the maximum movement distance is not detected in the current area detection process, the control section 20 determines that the touch area corresponding to the previous center position is a touch area at the time when the touch of the manipulation body on the first manipulation surface is terminated.

That is, if the touch area of the center position in which the inter-center distance to the previous center position is equal to or smaller than the maximum movement distance is not detected in the current area detection process, the control section 20 determines that the touch area corresponding to the previous center position is a touch area immediately before the manipulation body is disengaged from the first manipulation surface.

Further, if the touch area is not detected at all although the area detection process is performed, the control section 20 also determines whether the touch area is detected in the previous (one time before) area detection process.

As a result, if the touch area is detected in the previous area detection process, the control section 20 determines that the previous touch area is a touch area at the time when the touch of the manipulation body on the first manipulation surface is terminated.

That is, even though the touch area is detected in the previous area detection process, if the touch area is not detected at all in the current area detection process, the control section 20 determines that the previous touch area is a touch area immediately before the manipulation body is disengaged from the first manipulation surface.

In this way, the control section 20 sequentially performs the area detection processes, to thereby detect the touch area whenever the manipulation body is in touch with the first manipulation surface when the touch manipulation is started.

Further, the control section 20 sequentially performs the area detection processes, to thereby sequentially trace one touch area by means of the manipulation body for detection while the manipulation body is in touch with the first manipulation surface (while the touch manipulation is being performed on the first manipulation surface).

That is, if the control section 20 performs the area detection process to detect one touch area at the time when the touch of the manipulation body is started, the control section 20 sequentially performs the area detection processes, to thereby trace the one touch area by means of the manipulation body until the touch of the manipulation body is terminated.

With such a configuration, for example, if the one touch area is detected as the touch area at the time when the touch of the manipulation body is started in a state where the touch area is not detected at all (in a state where the touch manipulation is not performed on the first manipulation surface), at this time, the control section 20 determines that the touch manipulation is started.

At this time, the control section 20 starts measurement of the time (hereinafter, referred to as "touch time") when the manipulation body is in touch with the first manipulation surface by the touch manipulation performed on the first manipulation surface, for example, by a timer (not shown), according to the determination that the touch manipulation is started.

Further, for example, the control section 20 also starts the detection of the movement trace of the manipulation body, using the center position of the touch area at the time when the touch of the manipulation body is started as a starting point, according to the start of the touch manipulation.

Whenever the control section 20 detects the touch area and the center position thereof by means of the touch manipulation by performing the area detection process after the touch manipulation is started, the control section 20 sequentially traces the detected center position from the starting point (center position), to thereby detect the movement trace of the manipulation body.

Further, the control section 20 compares the touch time with a predetermined time selected in advance for detection of the touch manipulation, for example, which is equal to or shorter than 1 [sec] (hereinafter, referred to as "tap detection time").

As a result, if the touch manipulation is terminated before the touch time reaches the tap detection time and the measurement of the touch time is terminated, the control section 20 determines whether the movement trace detected thus far falls within a circle of a predetermined radius centering on the starting point (center position).

The circle centering on the starting point is used for detecting the type of the touch manipulation. Hereinafter, the circle is referred to as a "type detection circle". Further, the radius of the type detection circle is selected in advance with a predetermined length equal to or shorter than 1 [mm], for example.

If the movement trace of the manipulation body from the start of the touch manipulation to the end thereof falls within the type detection circle, at this time the control section 20 determines that the touch manipulation performed on the first manipulation surface is the tap manipulation.

Further, the control section 20 uses the center position (that is, the center position indicated by the coordinates of the pixel position) of the touch area at the time when the touch of the manipulation body through the tap manipulation is terminated, as a tap indication position indicated by the tap manipulation in an image displayed on the display surface of the first liquid crystal display panel 14A at this time.

In this respect, if the movement trace of the manipulation body from the start of the touch manipulation to the end thereof extends outside the type detection circle, at this time, the control section 20 determines that the touch manipulation performed on the first manipulation surface is not the tap manipulation.

Further, if the touch time measured by a timer is beyond the tap detection time, whenever the movement trace of the manipulation body is sequentially updated according to the detection of the center position, the control section 20 determines whether the updated movement trace extends outside the type detection circle.

As a result, if it is detected that the movement trace of the manipulation body extends outside the type detection circle in the touch manipulation performed beyond the tap detection time, at this time, the control section 20 determines that the touch manipulation performed on the first manipulation surface is the sliding manipulation.

In this case, until the sliding manipulation is terminated after the time (hereinafter, referred to as "sliding manipulation detection time") when it is detected that the touch manipulation is the sliding manipulation, the control section 20 sequentially updates the movement trace of the manipulation body according to the detection of the center position. Further, the control section 20 uses the movement trace of the manipulation body through the sliding manipulation for image scrolling, for example.

If the touch manipulation is terminated in a state where the movement trace of the manipulation body falls within the type detection circle in the touch manipulation performed beyond the tap detection time, at this time, the control section 20 determines that the manipulation body is mistakenly in touch with the first manipulation surface and the touch manipulation is not performed.

In this way, the control section 20 can detect that the tap manipulation is performed using one finger which is an example of the manipulation body on the first manipulation surface of the first touch panel 14B.

Further, the control section 20 can also detect that the sliding manipulation is performed using one finger which is the example of the manipulation body on the first manipulation surface of the first touch panel 14B.

On the other hand, if the control section 20 performs the area detection process to detect the touch area and the center position thereof on the basis of the panel output signal obtained from the second touch panel 15B, similarly, the control section 20 performs the same process as the process for detecting the type of the touch manipulation performed on the first manipulation surface.

Accordingly, the control section 20 can detect that the tap manipulation is performed using one finger which is the example of the manipulation body on the second manipulation surface of the second touch panel 15B.

Further, the control section 20 can also detect that the sliding manipulation is performed using one finger which is the example of the manipulation body on the second manipulation surface of the second touch panel 15B.

However, for example, image data on a variety of images such as a menu image in which the indication items indicating a variety of commands are arranged is stored in advance in the non-volatile memory 21. Further, a command detection table generated for each image is stored in advance in the non-volatile memory 21.

Arrangement area information indicating arrangement areas of the indication items in the corresponding image as coordinates of pixel positions and commands which can be input, which are allocated to the indication items, are correspondingly stored in each command detection table.

Accordingly, in a case where the control section 20 reads the image data from the non-volatile memory 21, and for example, displays the image based on the image data on the first liquid crystal display panel 14A, the control section 20 reads out the command detection table corresponding to the image data into the RAM 22 from the non-volatile memory 21 for command detection.

In this state, if it is detected that the tap manipulation is performed on the first manipulation surface of the first touch panel 14B, the control section 20 detects an arrangement area including the tap indication position through the tap manipulation from among the arrangement areas indicated by the plural pieces of arrangement area information stored in the command detection table.

Further, the control section 20 detects the command (that is, a command corresponding to the arrangement area including the tap indication position) which is input by the tap manipulation at this time, on the basis of the command detection table.

In this way, the control section 20 detects the command input by the tap manipulation and performs a process according to the detected command.

Further, if an image is displayed on the first liquid crystal display panel 14A, the control section 20 determines whether the entire image can be displayed on the display surface, and then recognizes whether the image can be scrolled according to the determination result.

Accordingly, if it is detected that the sliding manipulation is performed on the first manipulation surface in a state where the image can be scrolled, the control section 20 scrolls the image which is being displayed on the first liquid crystal display panel 14A, for example, so as to trace the movement of the manipulation body, on the basis of the movement trace detected at this time.

Further, if it is detected that the sliding manipulation is performed on the first manipulation surface in a state where the image is unable to be scrolled, the control section 20 negates the detection.

Further, when it is detected that the tap manipulation is performed on the second manipulation surface of the second touch panel 15B, in a state where the image is displayed on the second liquid crystal display panel 15A, similarly, the control section 20 detects the command input by the tap manipulation.

Further, if the command input by the tap manipulation is detected in this way, the control section 20 performs a process according to the detected command.

Further, when the image is displayed on the second liquid crystal display panel 15A, the control section 20 also detects whether the entire image can be displayed on the display surface, and then recognizes whether the image can be scrolled according to the detection result.

Accordingly, if it is detected that the sliding manipulation is performed on the second manipulation surface in a state where the image can be scrolled, the control section 20 scrolls the image which is being displayed on the second liquid crystal display panel 15A, for example, so as to trace the movement of the manipulation body, on the basis of the movement trace detected at this time.

If it is detected that the sliding manipulation is performed on the second manipulation surface in a state where the image is unable to be scrolled, similarly, the control section 20 negates the detection.

In practice, for example, in a state where an image having an indication item (reproduction button) to which a reproduction command for reproducing music data is allocated is displayed on the first liquid crystal display panel 14A, if the indication item is indicated by the tap manipulation, the control section 20 recognizes that the reproduction command is input.

In this case, the control section 20 reads out the music data from the non-volatile memory 21 according to the input of the reproduction command to transmit it to a reproducing section 23.

The reproducing section 23 performs a reproduction process such as a decoding process, a digital-analog conversion process, an amplification process and the like for the music data under the control of the control section 20, to thereby generate a music signal and output it through a headphone terminal (not shown).

Thus, the control section 20 can allow the user to listen to music through headphones connected to the headphone terminal.

At this time, the control section 20 reads out information about track titles, artist names or the like relating to the music data from the non-volatile memory 21, and then displays it on the second liquid crystal display panel 15A, for example.

Accordingly, the control section 20 can present the information about the music which is being reproduced to the user through the second liquid crystal display panel 15A.

Further, for example, in a state where an image having an indication item to which a start-up command for starting a web browser is allocated is displayed on the first liquid crystal display panel 14A, if the indication item is indicated by the tap manipulation, the control section 20 recognizes that the start-up command is input.

Figure 6:
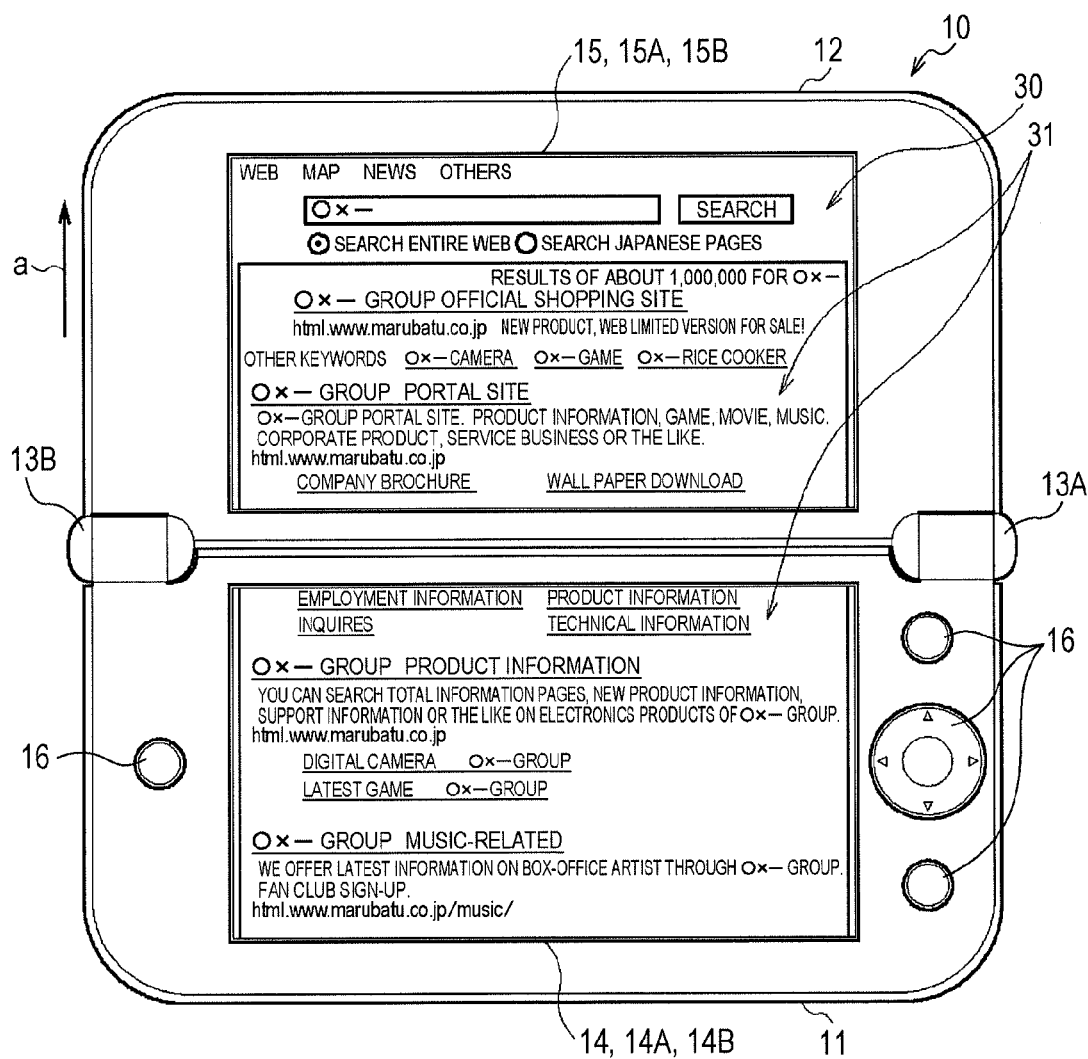
FIG. 6 is a diagram schematically illustrating display of a web browser image and a page image according to a tap manipulation.

In this case, as shown in FIG. 6, the control section 20 starts up the web browser according to the input of the start-up command, and displays a web browser image 30 across the second liquid crystal display panel 15A to the first liquid crystal display panel 14A.

That is, at this time, the control section 20 considers both the display surfaces of the second liquid crystal display panel 15A and the first liquid crystal display panel 14A as one display surface, and displays the web browser image 30 on these display surfaces.

Further, at this time, the control section 20 receives page data on a web page from a server on a network through a network interface 24, and displays a page image 31 based on the page data in the web browser image 30.

Thus, the control section 20 can allow a user to browse the web browser image 30 and the web page (that is, page image 31) through the first liquid crystal display panel 14A and the second liquid crystal display panel 15A.

At this time, for example, if it is detected that the sliding manipulation for moving the manipulation body from the lower side to the upper side indicated by an arrow a is performed on the first manipulation surface of the first touch panel 14B, the control section 20 scrolls the entire web browser image 30 together with the page image 31 up.

Further, for example, if it is detected that the sliding manipulation for moving the manipulation body from the lower side to the upper side is performed on the second manipulation surface of the second touch panel 15B at this time, similarly, the control section 20 scrolls the entire web browser image 30 together with the page image 31 up.

Further, at this time, if the sliding manipulation for moving the manipulation body from the upper side to the lower side is performed on the first manipulation surface or the second manipulation surface, the control section 20 may scroll the entire web browser image 30 together with the page image 31 down according to the sliding manipulation.

Accordingly, even in the case where the entire page image 31 is unable to be displayed across both the display surfaces of the second liquid crystal display panel 15A and the first liquid crystal display panel 14A, the control section 20 may appropriately scroll the page image 31 to be completely displayed.

However, the indication items to which a variety of commands is allocated are arranged in the page image 31. Further, in the page image 31, position-in-image information indicating the arrangement areas of the indication items as the coordinates in the image and the commands allocated to the indication items are correspondingly added.

If the indication items of the page image 31 are displayed on the first liquid crystal display panel 14A, the control section 20 matches the commands allocated to the indication items with the display area information indicating the display areas of the indication items on the first liquid crystal display panel 14A as the coordinates of the pixel positions.

Further, if the indication items of the page image 31 are displayed on the second liquid crystal display panel 15A, the control section 20 matches the commands allocated to the indication items with the display area information indicating the display areas of the indication items on the second liquid crystal display panel 15A as the coordinates of the pixel positions.

In a case where the page image 31 is scrolled to displace the display areas of the indication items, the control section 20 changes the display area information corresponding to the commands allocated to the indication items into display area information indicating the display areas after transition as the coordinates of the pixel positions.

Accordingly, if it is detected that the tap manipulation is performed on the first manipulation surface of the first touch panel 14B, the control section 20 detects a display area including the tap indication position through the tap manipulation, from the display areas indicated by one piece or plural pieces of display area information on the first liquid crystal display panel 14A.

Thus, the control section 20 detects a command (that is, a command corresponding to the display area including the tap indication position) input by the tap manipulation performed on the page image 31 at this time.

Further, if it is detected that the tap manipulation is performed on the second manipulation surface of the second touch panel 15B, the control section 20 detects a display area including the tap indication position through the tap manipulation, from the display areas indicated by one piece or plural pieces of display area information on the second liquid crystal display panel 15A.

Thus, the control section 20 detects a command (that is, a command corresponding to the display area including the tap indication position) input by the tap manipulation performed on the page image 31 at this time.

Further, if the command input by the tap manipulation is detected in this way, the control section 20 receives new page data from the server according to the detected command, for example, and performs a process of displaying the page image based on the page data.

In this way, even in the case where the image acquired from the outside such as a page image 31 is displayed, if the tap manipulation is performed on the image, the control section 20 detects the command input by the tap manipulation and performs a corresponding process.

[1-2-3. Display Control Process According to Proximity Manipulation]

However, as the proximity manipulation which is performed for the first manipulation surface of the first touch panel 14B or the second manipulation surface of the second touch panel 15B, there is a manipulation which is performed in a state where the manipulation body moves close to the first manipulation surface or the second manipulation surface while barely moving the manipulation body over the first manipulation surface or the second manipulation surface.

Hereinafter, the manipulation which is performed in a state where the manipulation body moves close to the first manipulation surface or the second manipulation surface while barely moving the manipulation body over the first manipulation surface or the second manipulation surface is particularly referred to as "continuous proximity manipulation".

Continuous proximity manipulation is also a manipulation which is performed to enlarge an enlargement target portion at a random enlargement ratio to be displayed by using part of the image as the enlargement target portion, when the image is displayed on the first liquid crystal display panel 14A or the second liquid crystal display panel 15A.

Here, if the manipulation body moves close to only a single location in the first manipulation surface or the second manipulation surface as described above, the control section 20 detects only one proximity area, and if each manipulation body moves close to a plurality of locations in the first manipulation surface or the second manipulation surface, the control section 20 can detect a plurality of proximity areas at a time.

Accordingly, the continuous proximity manipulation can indicate a desired indication region by the size of the proximity area, the number of proximity areas, the positional relationship between the plurality of proximity areas or the like, detected by the continuous proximity manipulation.

Further, the continuous proximity manipulation can roughly indicate the enlargement target portion which is part of the image on the basis of the indication region and can arbitrarily indicate an enlargement ratio of the enlargement target portion.

Thus, the continuous proximity manipulation may be performed by, for example, one finger (only one finger moves close to the first manipulation surface or the second manipulation surface), a plurality of fingers (plural fingers simultaneously move close to the first manipulation surface or the second manipulation surface), or the like, with respect to the first manipulation surface or the second manipulation surface.

Further, as the proximity manipulation which is performed for the first manipulation surface of the first touch panel 14B or the second manipulation surface of the second touch panel 15B, there is a manipulation which is performed to move the manipulation body over the first manipulation surface or the second manipulation surface in a state where the manipulation body moves close to the first manipulation surface or the second manipulation surface.

Hereinafter, the manipulation which is performed to move the manipulation body over the first manipulation surface or the second manipulation surface, in a state where the manipulation body moves close to the first manipulation surface or the second manipulation surface, is particularly referred to as "proximity movement manipulation".

The proximity movement manipulation is a manipulation which is performed to indicate a change in the indication region and a change in the enlargement target portion subsequent to the continuous proximity manipulation, when the image is displayed on the first liquid crystal display panel 14A or the second liquid crystal display panel 15A.

Thus, if the continuous proximity manipulation is performed, for example, by one finger, the proximity movement manipulation is performed by only one finger subsequent to the continuous proximity manipulation, and if the continuous proximity manipulation is performed, for example, by a plurality of fingers, the proximity movement manipulation is performed by the plurality of fingers subsequent to the continuous proximity manipulation.

For this reason, if the proximity manipulation is performed, for example, by only one finger for the first manipulation surface or the second manipulation surface, whenever the area detection process is performed, from the start of the proximity manipulation to the end thereof, the control section 20 detects one proximity area by the one finger.

Further, similarly, in a case where the proximity manipulation is performed, for example, by the plurality of fingers for the first manipulation surface or the second manipulation surface (in a case where the plurality of fingers simultaneously move close to the first manipulation surface or the second manipulation surface), whenever the area detection process is performed, from the start of the proximity manipulation to the end thereof, the control section 20 detects the proximity areas.

At this time, if the plurality of fingers is arranged in touch with each other, the control section 20 detects one proximity area, for example, whenever the area detection process is performed, from the start of the proximity manipulation to the end thereof.

Further, if the plurality of fingers is separated from each other, the control section 20 detects the proximity areas of the plurality of fingers, for example, whenever the area detection process is performed, during the proximity manipulation.

Further, if a panel output signal is obtained from the first touch panel 14B to detect one or plural proximity areas and the center position thereof whenever the area detection process is performed, the control section 20 detects the type of the proximity manipulation which is performed on the first manipulation surface, on the basis of the series of detection results.

Further, similarly, in a case where a panel output signal is obtained from the second touch panel 15B to detect one or plural proximity areas and the center position thereof whenever the area detection process is performed, the control section 20 detects the type of the proximity manipulation which is performed on the second manipulation surface, on the basis of the series of detection results.

Here, if the plurality of fingers is separated from each other when the proximity manipulation is performed by the plurality of fingers for the first manipulation surface or the second manipulation surface, a time difference may occur when the respective fingers move close to the first manipulation surface and reach within a proximity detection distance range according to bending degrees of the respective fingers.

That is, if the plurality of fingers is separated from each other when the proximity manipulation is performed, when the plurality of fingers moves close to the first manipulation surface or the second manipulation surface (when the proximity manipulation is started), the control section 20 may start to detect the plurality of proximity areas to be slightly shifted in terms of time by the plurality of fingers.

Further, even though the control section 20 starts to detect the plurality of proximity areas to be slightly shifted in terms of time by the plurality of fingers when the proximity manipulation is started in this way, the control section 20 should not mistakenly detect the plurality of proximity areas as proximity areas of different proximity manipulations.

That is, even though the control section 20 starts to detect the plurality of proximity areas to be slightly shifted in terms of time using the plurality of fingers when the proximity manipulation is started, the control section 20 should detect the type of the proximity manipulation using the plurality of proximity areas as areas based on the same proximity manipulation.

For this reason, in the area detection process, for example, if the panel output signal is obtained from the first touch panel 14B to detect one or plural proximity areas and the center position thereof, the control section 20 determines whether the proximity area is detected in the previous (one time before) area detection process.

As a result, if the proximity area is not detected at all in the previous area detection process, the control section 20 determines that one or plural proximity areas detected in the current area detection process is a proximity area at the time when the manipulation body starts to move close to the first manipulation surface, respectively.

On the other hand, if one or plural proximity areas are detected in the previous area detection process, the control section 20 calculates the inter-center distance between the center position detected in the previous area detection process and the center position detected in the current area detection process in a round-robin manner.

Further, the control section 20 compares the calculated one or plural inter-center distances with the maximum movement distance, respectively. Further, the control section 20 determines whether the center position within the maximum movement distance from the center position detected in the previous area detection process is detected in the current area detection process, on the basis of the comparison result.

As a result, if the center position within the maximum movement distance from the previous center position is detected in the current area detection process, the control section 20 determines that the previous and current proximity areas corresponding to the previous and current center positions are proximity areas based on the same manipulation body (the same finger).

That is, if the center position within the maximum movement distance from the previous center position is detected in the current area detection process, the control section 20 determines that the proximity area corresponding to the center position is a proximity area of the manipulation body which has been close to the first manipulation surface from the time of the previous area detection process.

Here, if one or plural center positions which are distant beyond the maximum movement distance from any previous center position are additionally detected in the current area detection process, the control section 20 determines that the proximity area corresponding to the detected center position is also the proximity area at the time when the proximity is started.

That is, when the plurality of fingers moves close to the first manipulation surface as described above, if the control section 20 starts to detect the plurality of proximity areas to be slightly shifted in terms of time by the plurality of fingers, the control section 20 determines that these proximity areas which start to be slightly shifted in terms of time are the proximity areas at the time when the proximity is started, respectively.

Further, if a center position having an inter-center distance to the previous center position equal to or shorter than the maximum movement distance is not detected in the current area detection process, the control section 20 determines that the manipulation body which has been in proximity to the proximity area corresponding to the previous center position moves away beyond the proximity detection distance range.

That is, if the proximity area of the center position having a distance from the previous center position equal to or shorter than the maximum movement distance is not detected in the current area detection process, the control section 20 determines that the proximity area corresponding to the previous center position is a proximity area at the time when the proximity of the manipulation body to the first manipulation surface is terminated.

Further, similarly, if the proximity area is not detected at all even though the area detection process is performed, the control section 20 determines whether the proximity area is detected in the previous (one time before) area detection process.

As a result, if the proximity area is detected in the previous area detection process, the control section 20 determines that the previous proximity area is a proximity area immediately before the manipulation body deviates from the proximity detection distance range from the first manipulation surface.

That is, even though the proximity area is detected in the previous area detection process, if the proximity area is not detected at all in the current area detection process, the control section 20 determines that the previous proximity area is a proximity area at the time when the proximity of the manipulation body to the first manipulation surface is terminated.

In this way, by sequentially performing the area detection processes, when the proximity manipulation is started, the control section 20 detects the proximity area whenever the manipulation body which has been in proximity to the first manipulation surface reaches within the proximity detection distance range.

Further, by sequentially performing the area detection processes, while the manipulation body is moving close to the first manipulation surface within the proximity detection distance range (while the proximity manipulation is being performed for the first manipulation surface), the control section 20 performs the detection to sequentially trace one or plural proximity areas through the manipulation body.

That is, if the area detection process is performed to detect one or plural proximity areas when the proximity of the manipulation body is started, the control section 20 then traces one or plural proximity areas using the manipulation body until the proximity of the manipulation body is terminated by sequentially performing the area detection processes.

With such a configuration, if one proximity area is detected when the proximity is started in a state where the proximity area and the touch area are not detected at all (in a state where the touch manipulation and the proximity manipulation are not detected at all), at this time, the control section 20 determines that the proximity manipulation is started.

Further, the control section 20 starts measurement of the time when the proximity manipulation is performed (that is, the time when the manipulation body is in proximity to the first manipulation surface, which is hereinafter referred to as "proximity time") by the timer (not shown), according to the start of the proximity manipulation.

If a proximity area which is to be detected as a proximity area at the time when the proximity is newly started is not additionally detected in a predetermined period when the area detection processes are performed, for example, several times or several tens of times, immediately after the proximity manipulation is started, the control section 20 determines that the proximity area through the proximity manipulation is only one.

That is, the control section 20 determines that only one proximity area detected when the start of the proximity manipulation is a proximity area through the proximity manipulation which is being performed at this time, and traces the one proximity area until the proximity manipulation is terminated.

On the other hand, if one or plural proximity areas are additionally detected in the predetermined time immediately after the proximity manipulation is started and are detected as proximity areas at the time when the proximity is newly started, the control section 20 determines that the number of proximity areas through the proximity manipulation is plural.

That is, the control section 20 determines that one proximity area, which is detected when it is determined that the proximity manipulation is started, and one or plural proximity areas, which are newly detected in the predetermined period immediately after the proximity manipulation is started, are proximity areas through the proximity manipulation which is being performed at this time.

In this case, the control section 20 traces the plurality of proximity areas determined as the proximity areas through the proximity manipulation until the proximity manipulation is terminated.

Further, for example, in a state where the proximity manipulation is not performed, the control section 20 detects the plurality of proximity areas at the same time, determines that the proximity manipulation is started even when it is determined that these proximity areas are the proximity areas at the time when the proximity of the manipulation body is started, respectively, and then starts measurement of the proximity time.

Further, in a similar way to the above-described case, the control section 20 detects the plurality of proximity areas through the proximity manipulation which is being performed at this time, and traces the detected plurality of proximity areas until the proximity manipulation is terminated.

If the control section 20 starts the measurement of the proximity time and detects and traces one or plural proximity areas through the proximity manipulation in this way, the control section 20 compares the proximity time with a predetermined time, for example, several seconds [sec] which is selected in advance for the continuous proximity manipulation detection. Hereinafter, the continuous proximity manipulation detection time is referred to as "continuous manipulation detection time"

As a result, before the proximity time reaches the continuous manipulation detection time, if it is determined that the traced one or plural proximity areas are the proximity areas at the time when the proximity is terminated, respectively, at this time, the control section 20 determines that the manipulation body mistakenly moves close to the first manipulation surface and thus the proximity manipulation is not performed.

That is, before the proximity time reaches the continuous manipulation detection time, if the manipulation body deviates from the proximity detection distance range from the first manipulation surface, the control section 20 determines that the proximity manipulation is not performed.

On the other hand, if the proximity time reaches the continuous manipulation detection time, the control section 20 determines that the proximity manipulation which is currently being performed for the first manipulation surface at that time is the continuous proximity manipulation.

Hereinafter, the time when it is determined that the proximity manipulation which is being performed for the first manipulation surface is the continuous proximity manipulation is referred to as "continuous manipulation detection time".

Further, the control section 20 detects an indication region, indicated by the continuous proximity manipulation, in the first manipulation surface on the basis of the proximity area (one or plural proximity areas traced from the start of the proximity manipulation to the continuous manipulation detection time) through the continuous proximity manipulation at the continuous manipulation detection time.

As shown in FIG. 7, in practice, if one proximity area CA2 through the continuous proximity manipulation is present, for example, the control section 20 detects the uppermost end point CA21, the lowermost end point CA22, the leftmost end point CA23, and the rightmost end point CA24 in the proximity area CA2.

Further, the control section 20 detects a rectangular area, which includes the proximity area CA2 and has sides each being in touch with the uppermost, lowermost, leftmost and rightmost end points CA21, CA22, CA23 and CA24 which are detected in the proximity area CA2, as an indication region IA1.

On the other hand, as shown in FIG. 8, if the proximity areas CA3 and CA4 through the continuous proximity manipulation are plural, for example, the control section 20 detects the uppermost end point CA41 and the lowermost end point CA31 from the plurality of proximity areas CA3 and CA4.

Further, for example, the control section 20 also detects the leftmost end point CA32 and the rightmost end point CA42 from the plurality of proximity areas CA3 and CA4.

Further, the control section 20 detects a rectangular area, which includes all the plurality of proximity areas CA3 and CA4 and has sides each being in touch with the uppermost, lowermost, leftmost and rightmost end points CA41, CA31, CA32 and CA42 which are detected in the plurality of proximity areas CA3 and CA4, as an indication region IA2.

In this way, if the indication regions IA1 and IA2 are detected, the control section 20 detects the areas of the detected indication regions IA1 and IA2.

At this time, for example, the control section 20 detects the areas of the indication regions IA1 and IA2 as the number of pixels positioned in portions, facing the indication regions IA1 and IA2, on the display surface of the first liquid crystal display panel 14A.

Here, for example, a detection table for detecting the enlargement target portion and the enlargement ratio (that is, the enlargement target portion which is part of the image, and its enlargement ratio) indicated by the continuous proximity manipulation on the basis of the areas of the indication regions IA1 and IA2 is stored in advance in the non-volatile memory 21.

As shown in FIG. 9, a plurality of pieces of area information SR, which indicates a plurality of areas which is selected in advance from the minimum area to the maximum area as the number of pixels, respectively, is stored in a detection table DT.

The minimum area is selected to be suitable for the area of the smallest indication region, which can be indicated by using a thin object such as a touch pen which is an example of the manipulation body when the continuous proximity manipulation is performed.

Further, the maximum area is selected as a predetermined area equal to or smaller than the entire display surface of the first liquid crystal display panel 14A or the second liquid crystal display panel 15A. Further, the plurality of areas to the maximum area from the minimum area is predetermined so as to be sequentially different from each other in the unit of a pixel.

Further, for example, a plurality of pieces of enlargement target portion information SZ, which is associated with the plurality of pieces of area information SR and indicates the size of the enlargement target portion in a case where the enlargement target portion of a rectangular shape having the same aspect ratio as that of the display surface has an area indicated by the area information SR as a rectangular frame, is also stored in the detection table DT.

Further, for example, a plurality of pieces of enlargement ratio information ER, which is associated with the plurality of pieces of enlargement target portion information SZ and indicates an enlargement ratio in a case where the enlargement target portion having a size indicated by the enlargement target portion information SZ is enlarged to become the size of the entire display surface, is also stored in the detection table DT.

That is, the enlargement ratio indicated by each piece of enlargement ratio information ER is selected to enlarge any corresponding enlargement target portion into the same size as the size of the entire display surface of the first liquid crystal display panel 14A (second liquid crystal display panel 15A).

Figure 10:
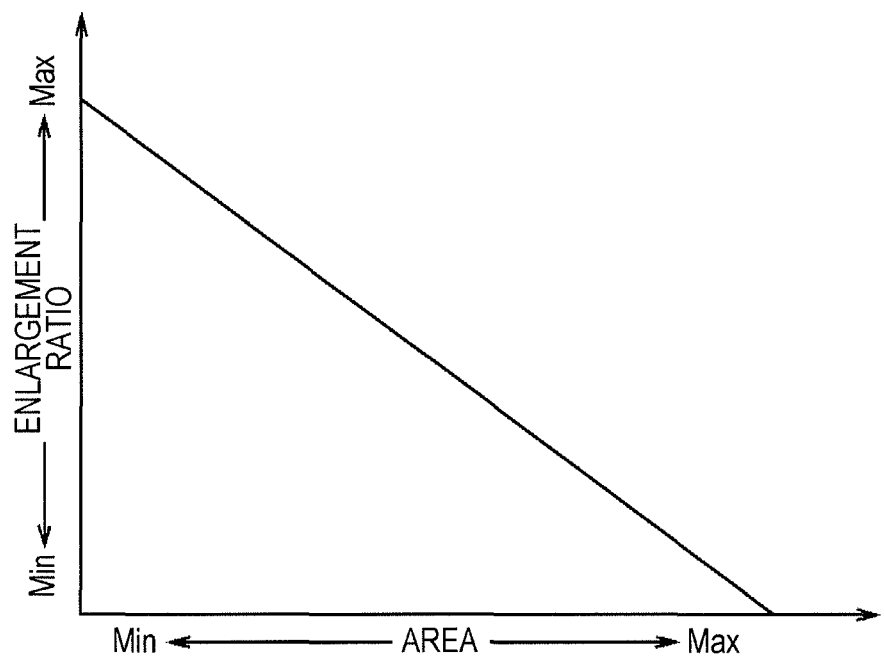
FIG. 10 is a diagram schematically illustrating a relationship between the area of an indication region and an enlargement ratio of an enlargement target portion.

Accordingly, as shown in FIG. 10, with respect to the enlargement ratio indicated by each piece of enlargement ratio information ER, the enlargement ratio corresponding to the enlargement target portion of the minimum area becomes the maximum, and the corresponding enlargement ratio is decreased as the area of the enlargement target portion is increased. Thus, the enlargement ratio corresponding to the enlargement target portion of the maximum area becomes the minimum.

If the areas of the indication regions IA1 and IA2 are detected, the control section 20 reads out the detection table DT in the RAM 22 from the non-volatile memory 21.

At this time, the control section 20 searches the area information SR indicating the same areas as the areas of the indication regions IA1 and IA2 from among the plurality of pieces of area information SR stored in the detection table DT.

Further, the control section 20 searches the enlargement target portion information SZ corresponding to the searched area information SR in the detection table DT, as enlargement target portion information SZ indicating the enlargement target portion indicated by the continuous proximity manipulation at this time.

Further, the control section 20 searches the enlargement ratio information ER corresponding to the searched enlargement target portion information SZ in the detection table DT, as enlargement ratio information ER indicating the enlargement ratio indicated by the continuous proximity manipulation at this time.

Thus, the control section 20 reads out the enlargement target portion information SZ and the enlargement ratio information ER searched on the basis of the areas of the indication regions IA1 and IA2 from the non-volatile memory 21.

In addition, the control section 20 detects center positions of the indication regions IA1 and IA2 at this time as coordinates of the pixel positions.

Figure 11A:
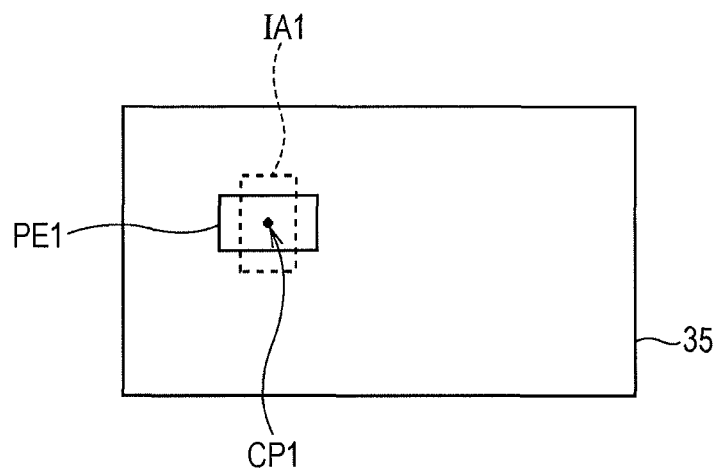
FIGS. 11A and 11B are diagrams schematically illustrating a cutout of an enlargement target portion from an image.
Figure 11B:
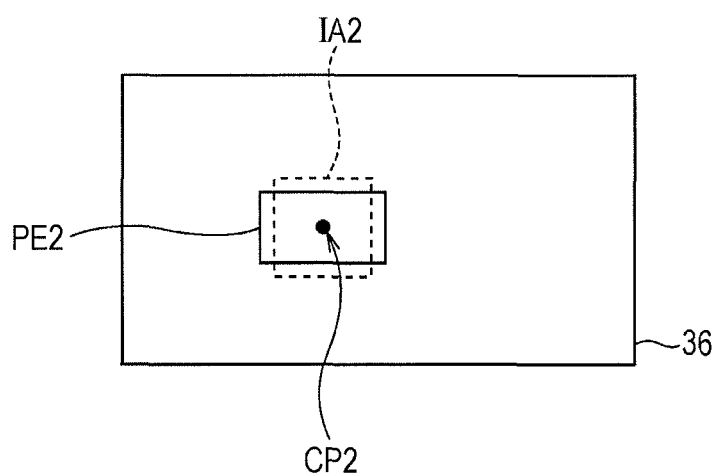

Further, as shown in FIGS. 11A and 11B, the control section 20 imports images 35 and 36 which are displayed on the first liquid crystal display panel 14A at this time.

Further, the control section 20 matches center positions of frames indicated by the searched enlargement target portion information SZ with the positions corresponding to the center positions CP1 and CP2 of the indication regions IA1 and IA2 in the images 35 and 36, to thereby overlap the frames with the images 35 and 36.

In this way, the control section 20 specifies portions surrounded by the frames indicated by the searched enlargement target portion information SZ in the images 35 and 36 which are being displayed on the first liquid crystal display panel 14A, as enlargement target portions PE1 and PE2 which are parts of the images 35 and 36.

Further, the control section 20 cuts out the specified enlargement target portions PE1 and PE2 from the images 35 and 36, and enlarges the cut-out enlargement target portions PE1 and PE2 at enlargement ratios indicated by the searched enlargement ratio information ER.

Figure 12:
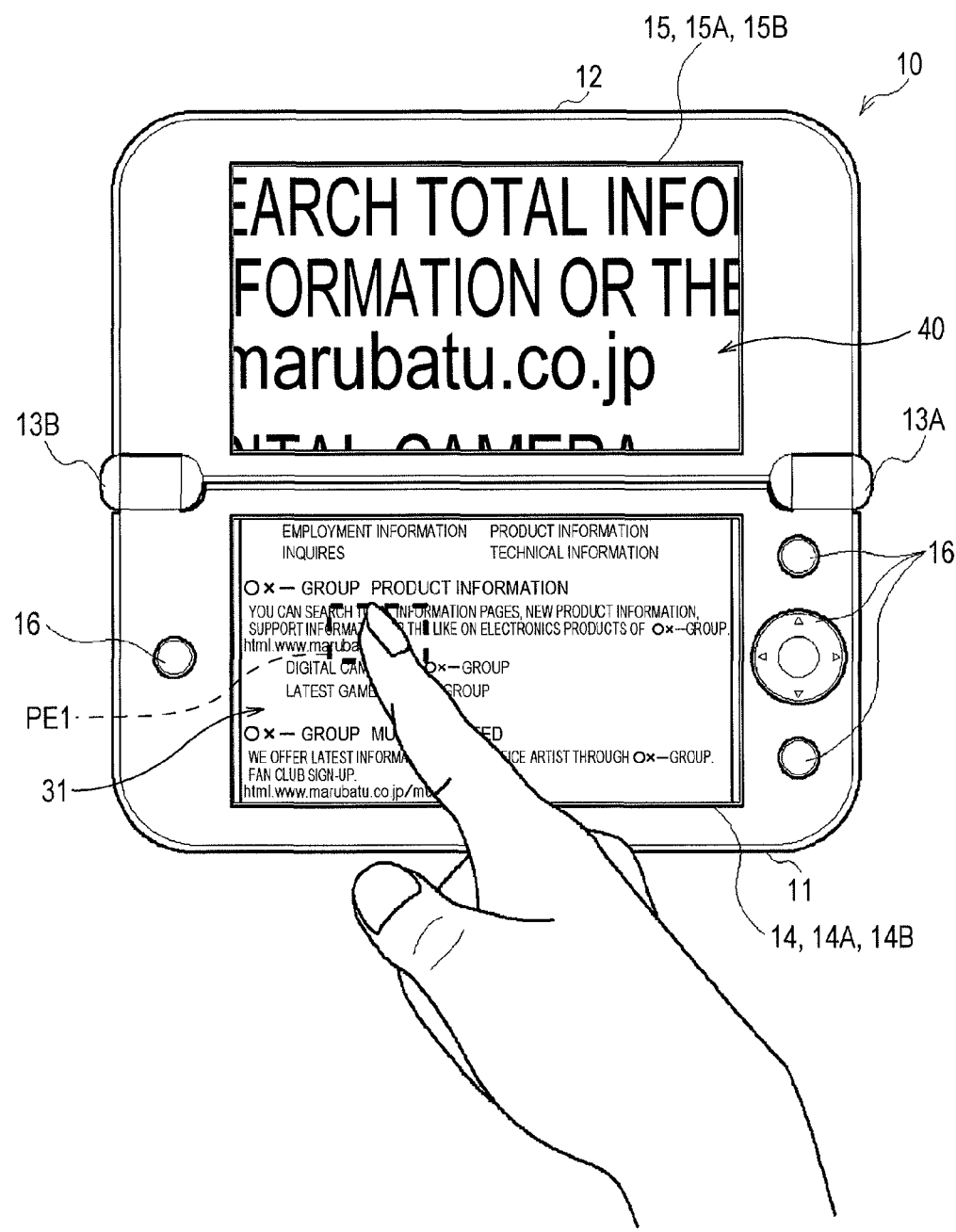
FIG. 12 is a diagram schematically illustrating a partially enlarged display (1) of an image according to a continuous proximity manipulation.
Figure 13:
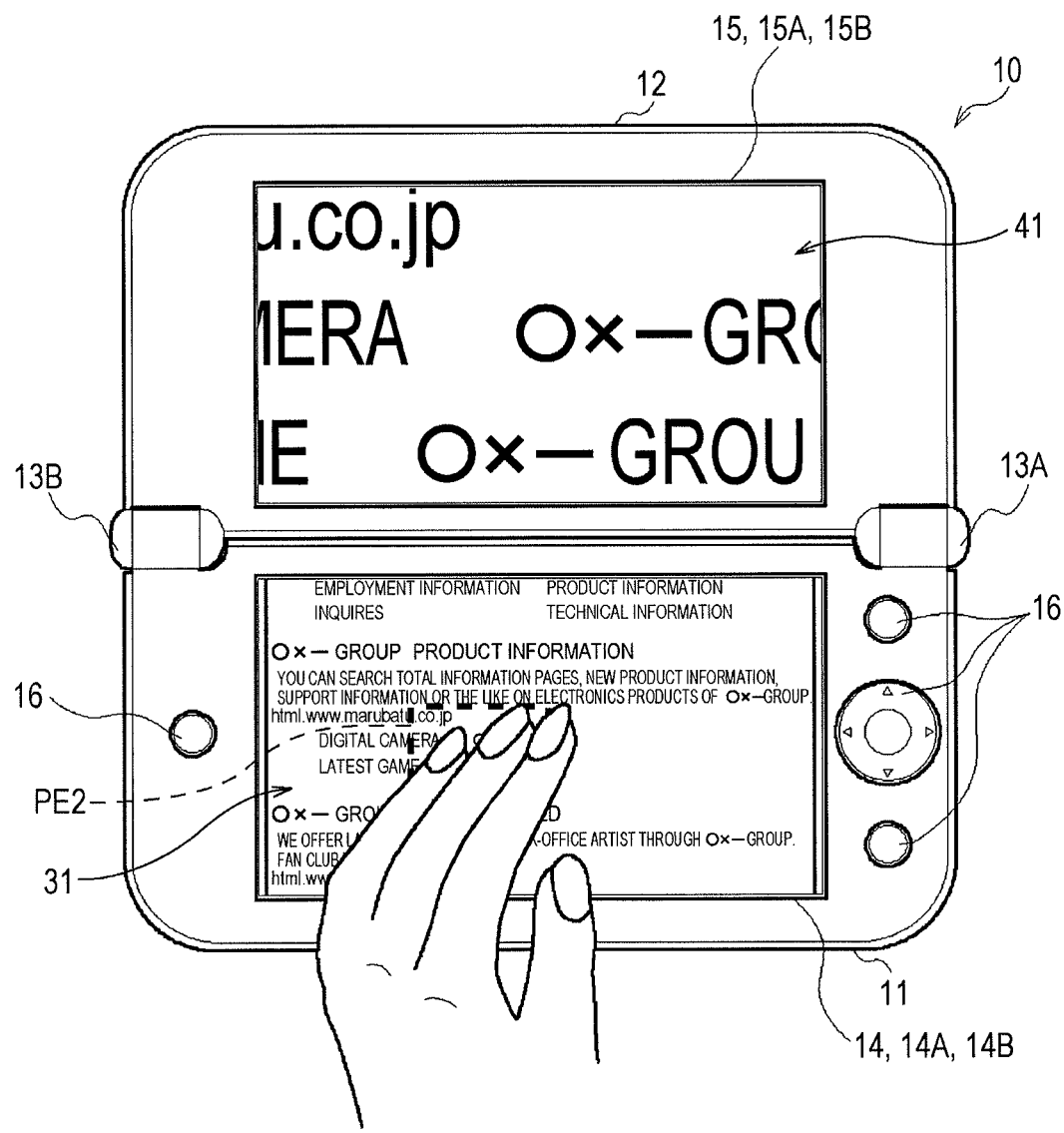
FIG. 13 is a diagram schematically illustrating a partially enlarged display (2) of an image according to a continuous proximity manipulation.

Further, as shown in FIGS. 12 and 13, the control section 20 displays enlarged images 40 and 41 obtained by enlarging the enlargement target portions PE1 and PE2 on the entire display surface of the second liquid crystal display panel 15A, instead of the images displayed on the second liquid crystal display panel 15A thus far.

Figure 14:
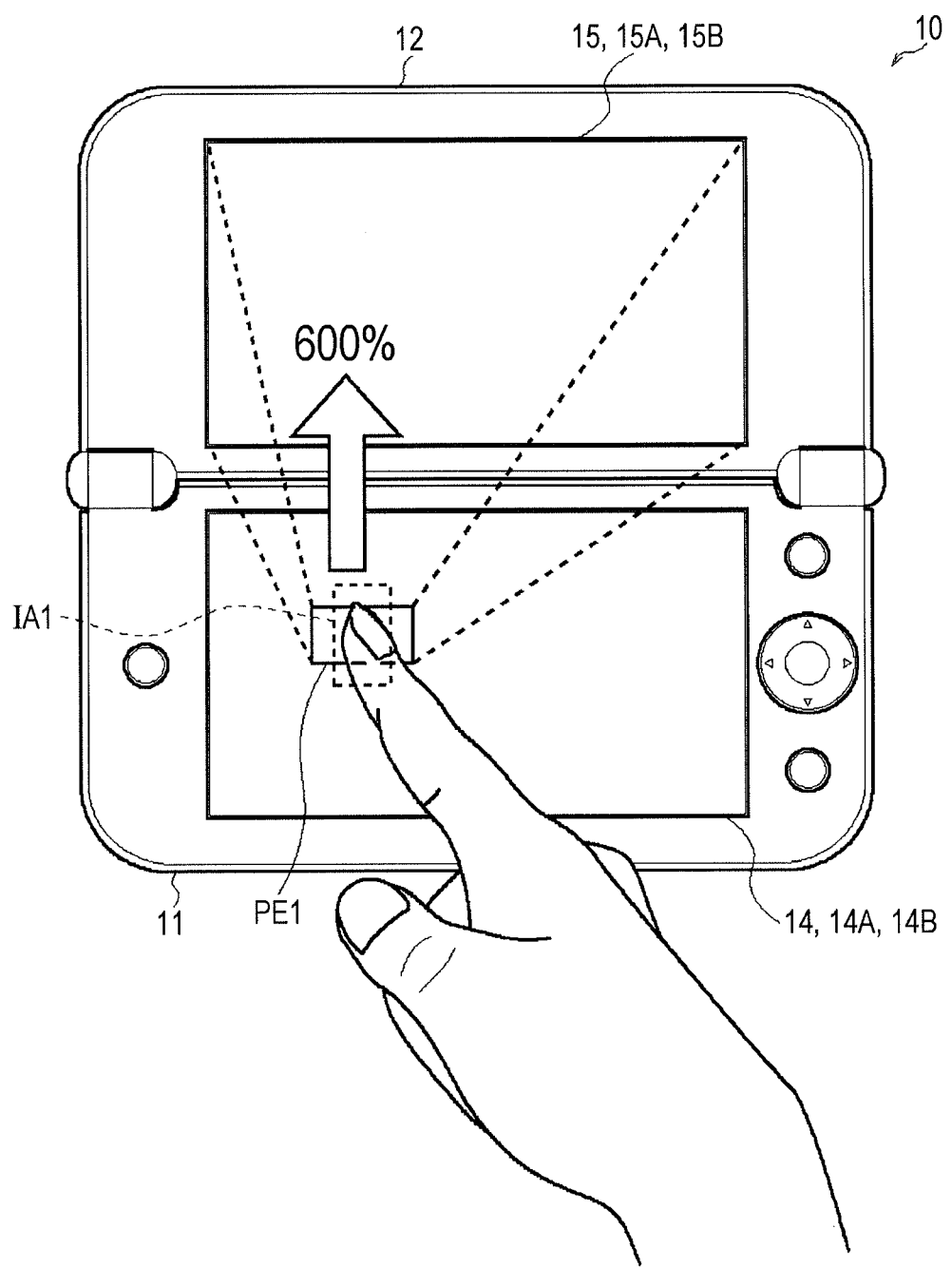
FIG. 14 is a diagram schematically illustrating an enlargement (1) of an enlargement target portion according to a continuous proximity manipulation.

In this way, as shown in FIG. 14, for example, if the continuous proximity manipulation is performed by one finger which is the manipulation body for the first manipulation surface, the control section 20 can indicate the indication region IA1 which is relatively small in area according to one proximity area through the continuous proximity manipulation.

Further, if the area of the indication region IA1 is relatively small in this way, the control section 20 can accordingly indicate the relatively small enlargement target portion PE1.

Further, if the indicated enlargement target portion PE1 is relatively small, the control section 20 can accordingly indicate an enlargement ratio of a relatively large value, as the enlargement ratio for the enlargement target portion PE1.

Figure 15:
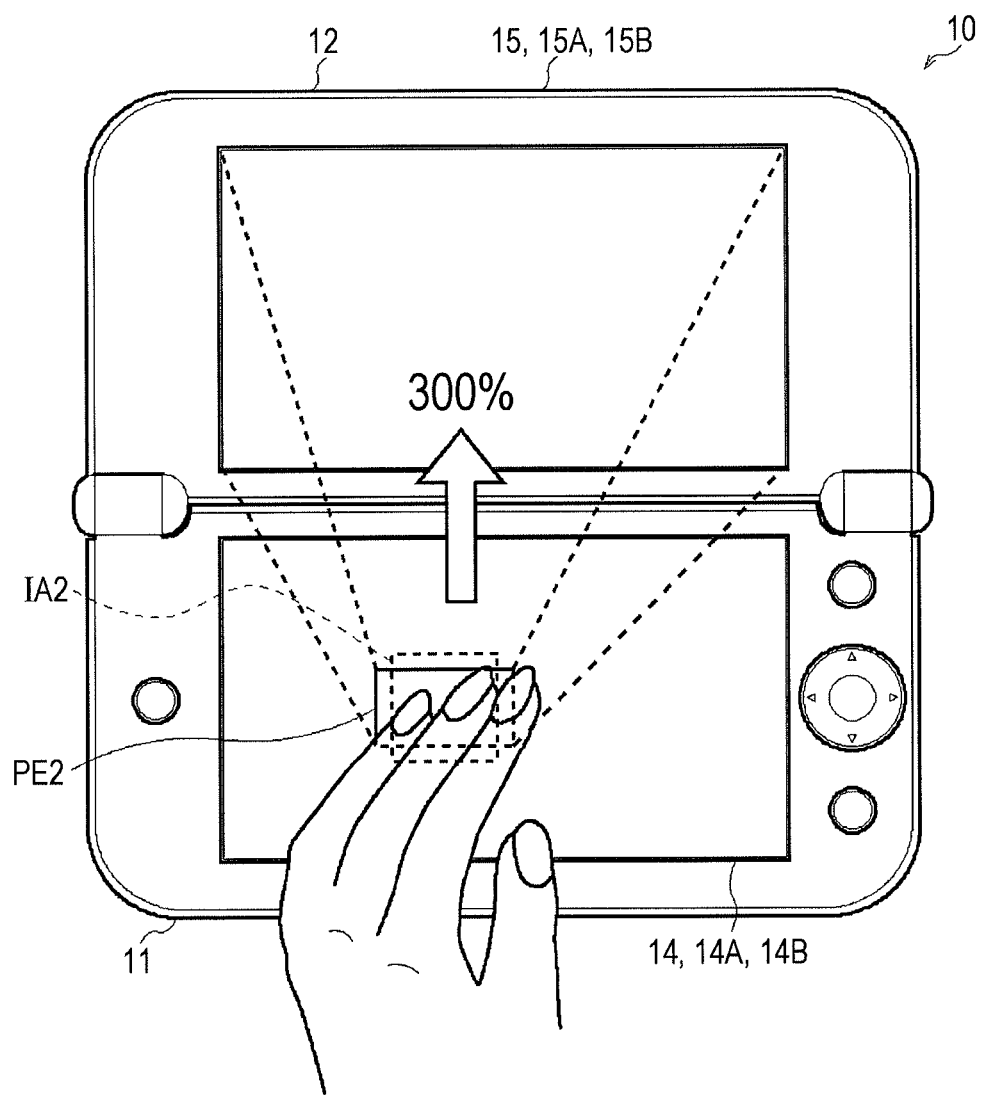
FIG. 15 is a diagram schematically illustrating an enlargement (2) of an enlargement target portion according to a continuous proximity manipulation.
Figure 16:
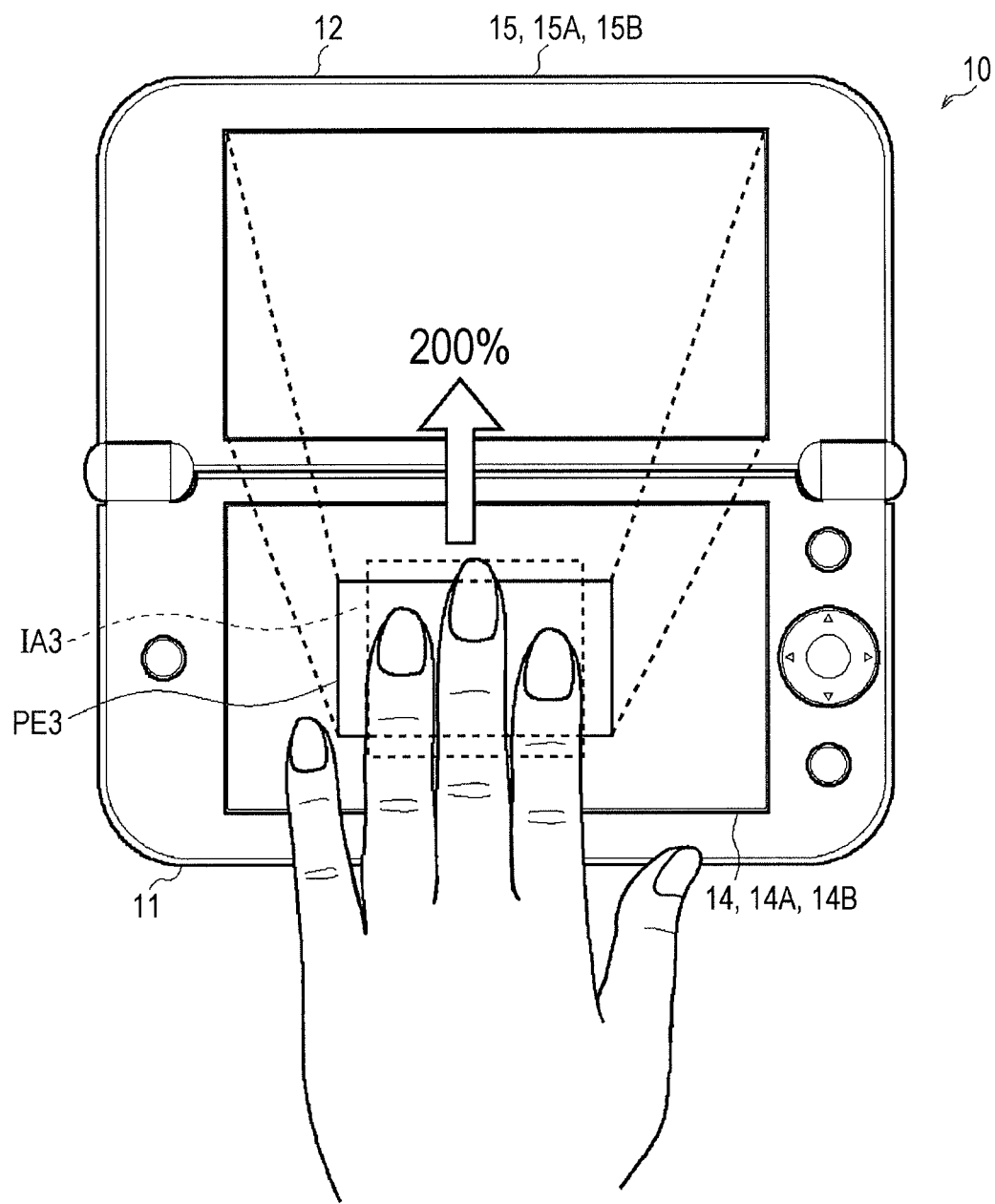
FIG. 16 is a diagram schematically illustrating an enlargement (3) of an enlargement target portion according to a continuous proximity manipulation.

On the other hand, as shown in FIGS. 15 and 16, for example, if the continuous proximity manipulation is performed by the plurality of fingers for the first manipulation surface, the control section 20 can arbitrarily increase the number or interval of proximity areas at the time of the continuous proximity manipulation.

Accordingly, as the number or interval of the proximity areas at the time of the continuous proximity manipulation is increased, the control section 20 can indicate the indication regions IA2 and IA3 having large areas.

Further, as the indicated enlargement target portions PE2 and PE3 become larger, the control section 20 can indicate enlargement ratios of smaller values.

However, if the enlarged images 40 and 41 are displayed, whenever the control section 20 performs thereafter the area detection processes to detect one or plural proximity areas through the continuous proximity manipulation, the control section 20 detects the indication regions and the center positions of the indication regions on the basis of the detected one or plural proximity areas, as described above.

Further, whenever the indication region and the center position thereof are detected through the continuous proximity manipulation after the continuous manipulation detection time, the control section 20 detects a distance (hereinafter, referred to as a "inter-center distance") between the detected center position and the center position of the indication region detected in the previous (one time before) area detection process.

Further, whenever detecting the inter-center distance, the control section 20 compares the detected inter-center distance with a predetermined distance (hereinafter, referred to as a "movement manipulation detection distance") equal to or smaller than 1 [mm], for example, which is set in advance for the proximity movement manipulation detection.

As a result, if the inter-center distance is shorter than the movement manipulation detection distance, the control section 20 determines that the proximity movement manipulation as the proximity manipulation is not performed for the first manipulation surface.

In this way, while the continuous proximity manipulation is performed from the continuous manipulation detection time (while one or plural proximity areas can be traced through the continuous proximity manipulation), the control section 20 continuously displays the above-described enlarged images 40 and 41 on the second liquid crystal display panel 15A as they are.

On the other hand, if it is detected that the inter-center distance is equal to or longer than the movement manipulation detection distance (that is, the indication region is displaced by the movement manipulation detection distance or longer), at this time, the control section 20 determines that the proximity movement manipulation is performed as the proximity manipulation for the first manipulation surface.

That is, if the indication region detected in the current area detection process is displaced by the movement manipulation detection distance or longer from the indication region detected in the previous area detection process, the control section 20 determines that the proximity manipulation which is currently being performed for the first manipulation surface is transited from the continuous proximity manipulation to the proximity movement manipulation.

Hereinafter, the time when it is determined that the proximity manipulation which is performed for the first manipulation surface is the proximity movement manipulation is referred to as "movement manipulation detection time".

At this time, in a similar way to the above-described case, the control section 20 detects the indication region, indicated by the proximity movement manipulation, in the first manipulation surface on the basis of the proximity area (one or plural proximity areas traced from the start of the proximity manipulation to the movement manipulation detection time) through the proximity movement manipulation at the time of the movement manipulation detection time.

Further, the control section 20 detects a center position of the indication region as coordinates of pixel positions, and matches a center position of a frame searched at the continuous manipulation detection time with a position corresponding to the center position in the image which is being displayed on the first liquid crystal display panel 14A, to thereby overlap the frame with the image.

In this way, the control section 20 specifies a portion, surrounded with the frame searched at the continuous manipulation detection time in the image which is being displayed on the first liquid crystal display panel 14A, as a new (that is, changed-position) enlargement target portion which is part of the image, on the basis of the indication region detected at this time.

Further, the control section 20 cuts out the newly specified enlargement target portion from the image, and enlarges the cut-out enlargement target portion at an enlargement ratio indicated at the continuous manipulation detection time (that is, enlargement ratio indicated by the enlargement ratio information ER which is searched at the continuous manipulation detection time).

Further, the control section 20 displays an enlarged image obtained by enlarging the enlargement target portion on the entire display surface of the second liquid crystal display panel 15A, instead of the enlarged image displayed on the second liquid crystal display panel 15A thus far.

However, whenever the control section 20 performs the area detection process after the movement manipulation detection time to detect one or plural proximity areas through the proximity movement manipulation, the control section 20 detects the indication region and the center position of the indication region on the basis of the detected one or plural proximity areas, as described above.

Further, whenever the control section 20 detects the indication region and the center position through the proximity movement manipulation after the movement manipulation detection time, the control section 20 detects the inter-center distance between the detected center position and the center position of the indication region detected in the previous (one time before) area detection process.

Further, whenever detecting the inter-center distance, the control section 20 compares the inter-center distance with the movement manipulation detection distance. As a result, if the inter-center distance is equal to or longer than the movement manipulation detection distance, the control section 20 determines that the proximity movement manipulation is still performed (the manipulation body moves over the first manipulation surface).

In this way, whenever performing the area detection process while the proximity movement manipulation is being performed for the first manipulation surface, the control section 20 sequentially detects the indication regions which are newly indicated by the proximity movement manipulation, to thereby change enlargement target portions in the image.

Further, the control section 20 sequentially enlarges the changed enlargement target portions at enlargement ratios indicated at the continuous manipulation detection time to generate enlarged images.

Figure 17:
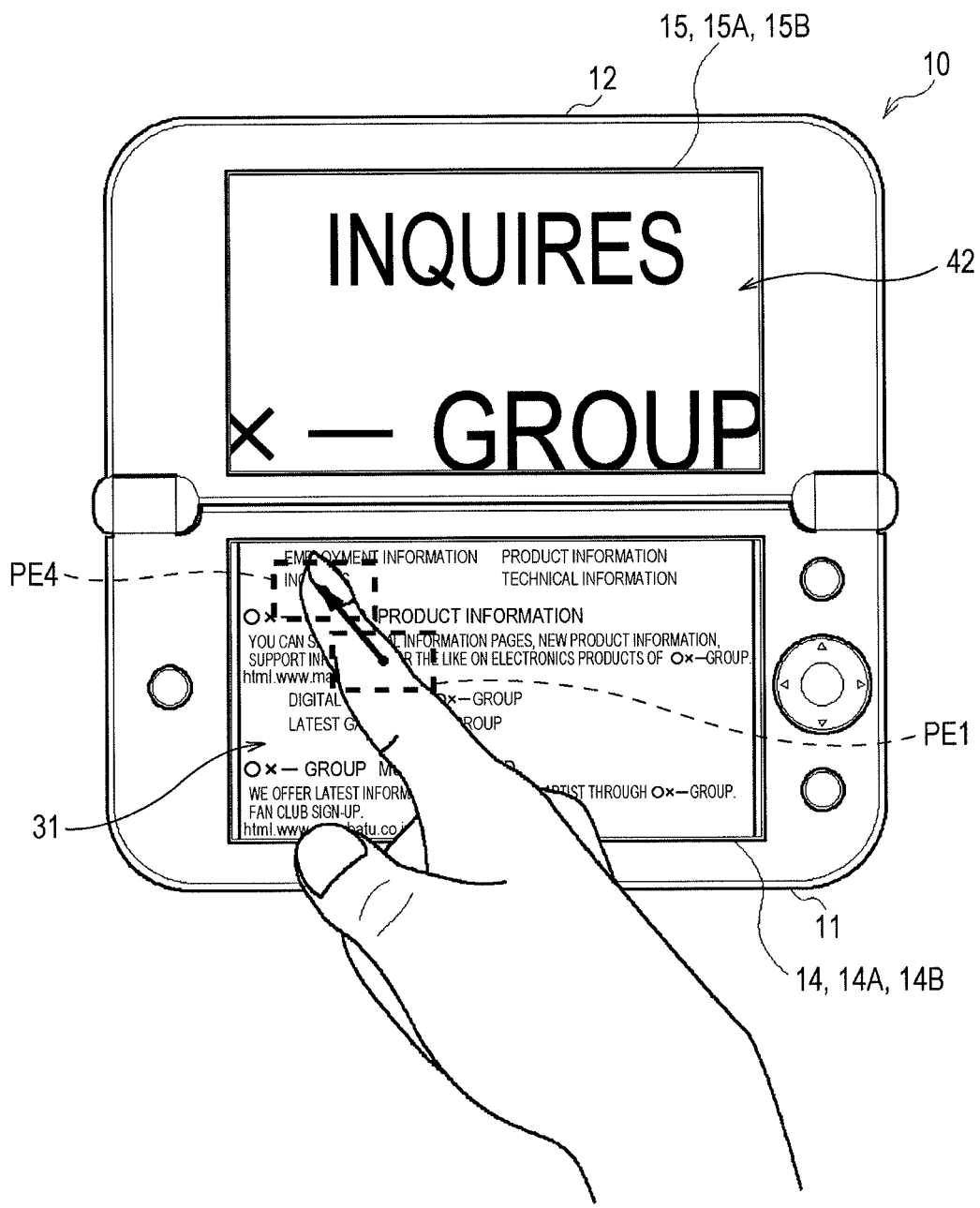
FIG. 17 is a diagram schematically illustrating a change (1) of an enlargement target portion according to a proximity movement manipulation.
Figure 18:
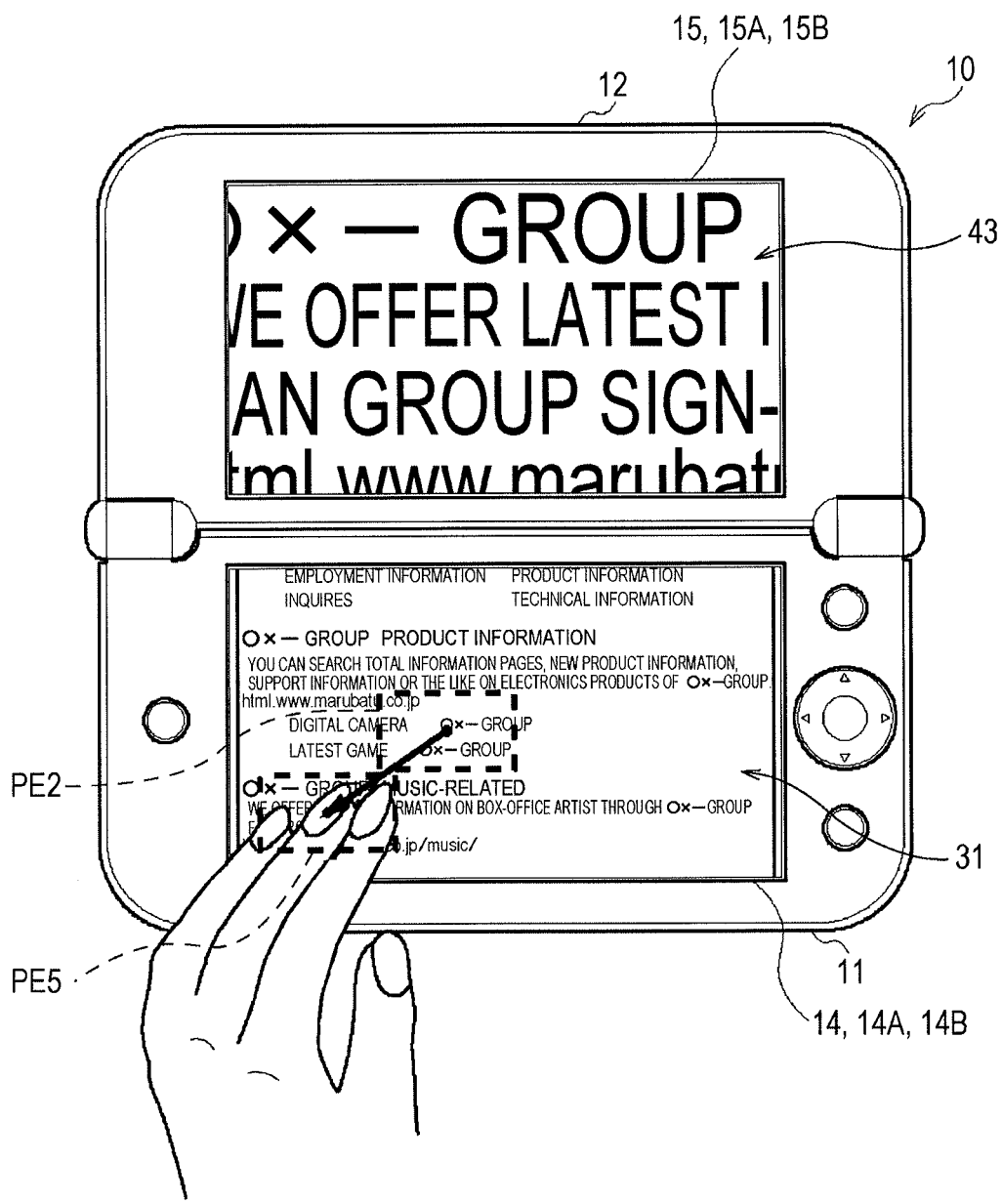
FIG. 18 is a diagram schematically illustrating a change (2) of an enlargement target portion according to a proximity movement manipulation.

Further, as shown in FIGS. 17 and 18, the control section 20 displays the enlarged images 42 and 43 obtained by enlarging the enlargement target portions PE4 and PE5 on the second liquid crystal display panel 15A, to thereby update the enlarged images 42 and 43 to be displayed on the second liquid crystal display panel 15A.

However, when the enlargement target portion which is part of the image is enlarged and displayed, the control section 20 does not allow the enlargement target portion to be directly indicated by bringing a finger, for example, in touch with the first manipulation surface, but allows the enlargement target portion to be indicated by moving the finger, for example, close to the first manipulation surface.

Further, in the continuous proximity manipulation in which the enlargement target portion is indicated by moving the finger close to the first manipulation surface, the enlargement target portion is roughly indicated according to the direction or the bending degree of each finger.

In particular, in the continuous proximity manipulation, in a case where it is performed by the plurality of fingers for the first manipulation surface, since the proximity by means of the plurality of fingers is not necessarily performed with a constant bending degree or a constant positional relationship according to the size or position of the enlargement target portion, the indication of the enlargement target portion is more roughly performed.

Accordingly, in a case where the continuous proximity manipulation is performed, the control section 20 detects a rectangular area including one or plural proximity areas through the continuous proximity manipulation as an indication region, and determines the enlargement target portion in the image which is displayed on the basis of the indication region.

In other words, the control section 20 has difficulty in correctly specifying the enlargement target portion in the image in the continuous proximity manipulation, and thus estimates the enlargement target portion for detection.

For this reason, when the proximity movement manipulation is performed for the first manipulation surface, even though the manipulation body moves in any direction of up, down, left and right directions over the first manipulation surface, the control section 20 sequentially detects indication regions which are newly indicated by the proximity movement manipulation, to thereby change the enlargement target portion in the image.

Accordingly, when the proximity movement manipulation is performed subsequent to the continuous proximity manipulation for the first manipulation surface, the control section 20 can arbitrarily change the enlargement target portion in the image according to the position of the indication region which is newly indicated by the proximity movement manipulation.

That is, if subsequently the proximity movement manipulation is performed while the enlargement target portion in the image is roughly indicated by the continuous proximity manipulation, the control section 20 accordingly changes the enlargement target portion, to thereby correctly enlarge the desired enlargement target portion in the image to be displayed.

Further, the control section 20 does not only use the proximity movement manipulation to compensate for the rough indication of the enlargement target portion through the continuous proximity manipulation, but also to continuously confirm contents of a plurality of portions of a relatively fine image of a picture.

Figure 19:
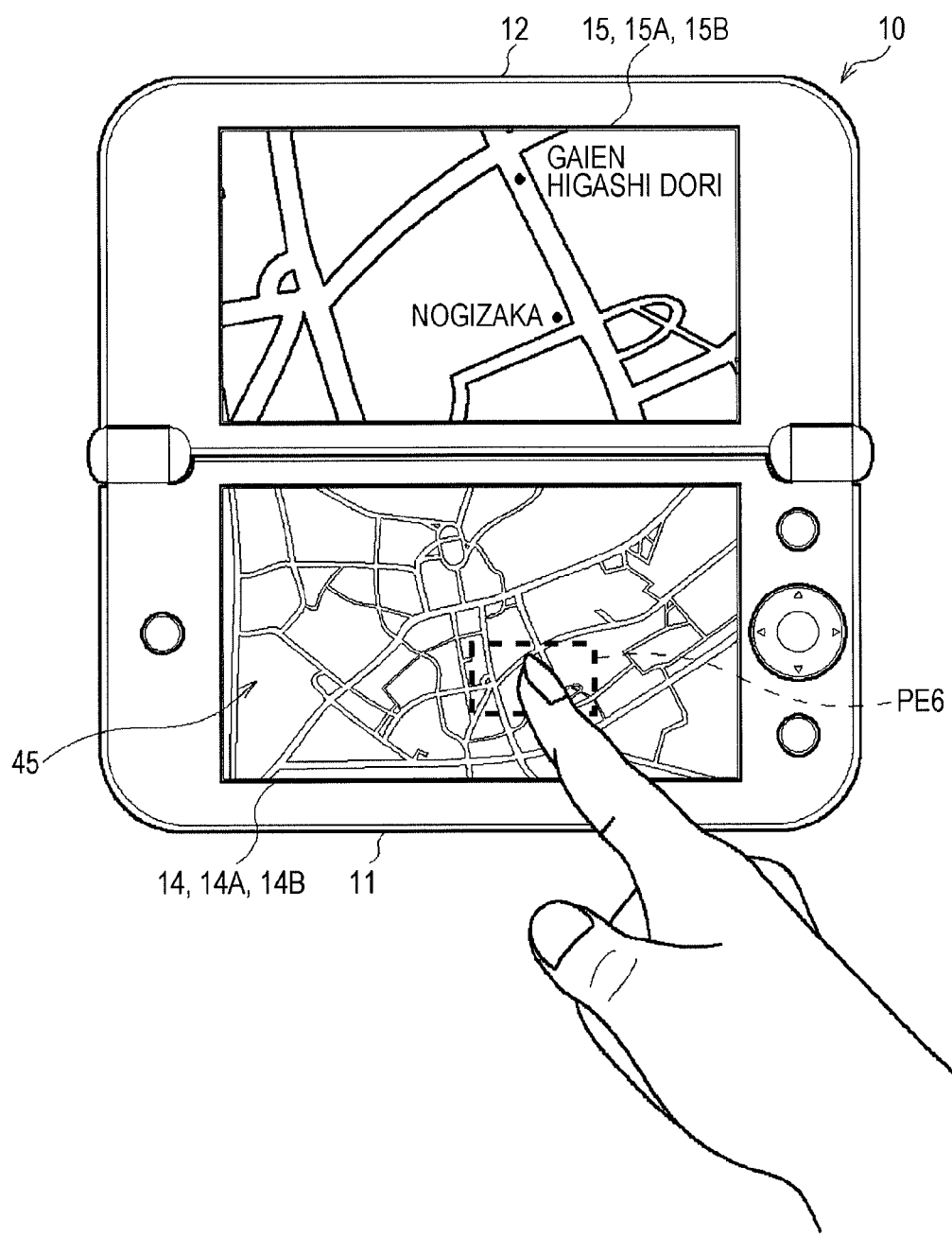
FIG. 19 is a diagram schematically illustrating a continuous change (1) of an enlargement target portion according to a proximity movement manipulation.
Figure 20:
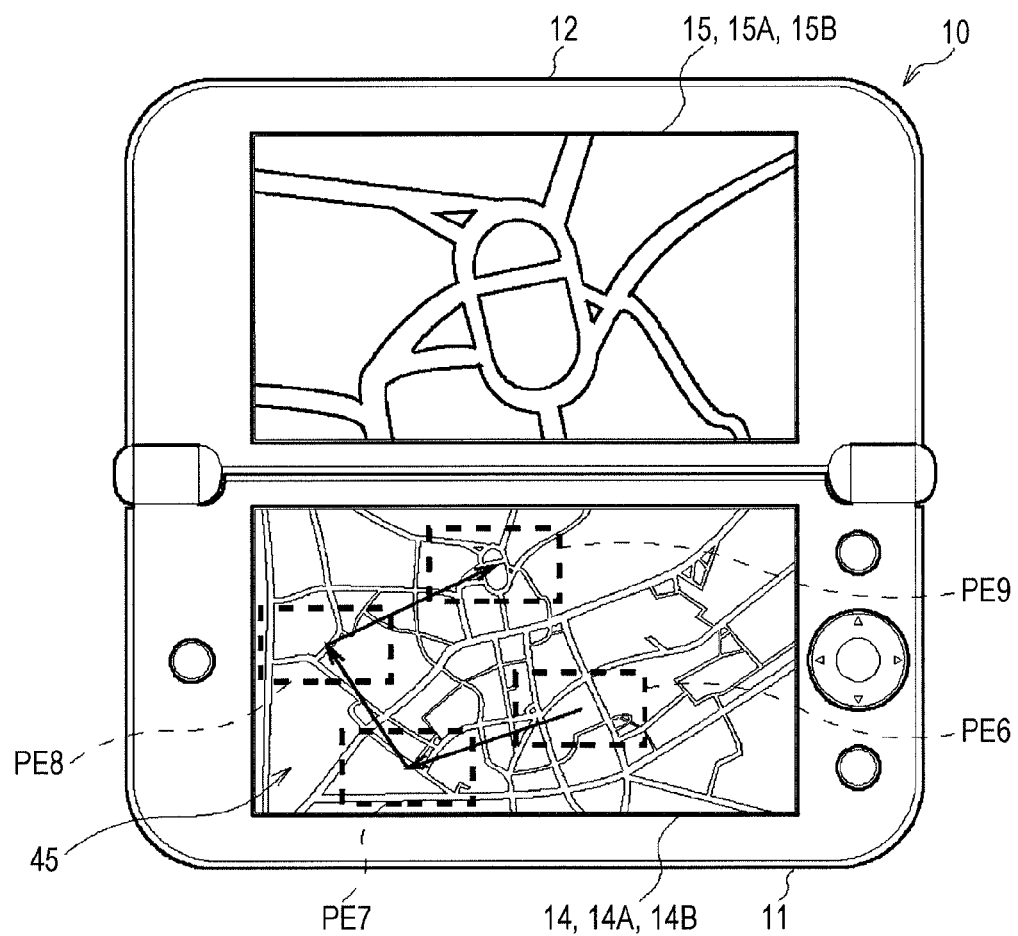
FIG. 20 is a diagram schematically illustrating a continuous change (2) of an enlargement target portion according to a proximity movement manipulation.

That is, as shown in FIGS. 19 and 20, for example, in a case where a map image 45 is displayed on the first liquid crystal display panel 14A, if an enlargement target portion PE6 is indicated by the continuous proximity manipulation, the control section 20 enlarges the enlargement target portion PE6 and displays it on the second liquid crystal display panel 15A.

Further, at this time, if the proximity movement manipulation is performed subsequent to the continuous proximity manipulation, the control section 20 continuously changes and enlarges enlargement target portions PE6 to PE9 in the map image 45, to thereby display them on the second liquid crystal display panel 15A.

In this way, even though the plurality of portions which a user desires to confirm the contents exists in the image displayed on the first liquid crystal display panel 14A are plural, the control section 20 can easily confirm the contents of the plurality of portions with a simple manipulation, without repeatedly performing the continuous proximity manipulation for the first manipulation surface.

However, even though the enlargement target portion is appropriately changed according to the proximity movement manipulation, the control section 20 performs the area detection process and compares the inter-center distance with the movement manipulation detection distance, and as a result, if the inter-center distance is shorter than the movement manipulation detection distance, the control section 20 determines that the proximity movement manipulation is transited to the continuous proximity manipulation.

At this time, the control section 20 displays the enlarged images 40 and 41 which are generated at the time of the previous area detection process on the second liquid crystal display panel 15A as they are.

Further, after it is determined that the proximity movement manipulation is transited to the continuous proximity manipulation, if the area detection process is performed and one or plural proximity areas are traced and detected through the area detection process (if the manipulation body moves close to the first manipulation surface), the control section 20 determines that the continuous proximity manipulation is maintained.

Accordingly, the control section 20 continuously displays the enlarged images 40 and 41 which are previously generated on the second liquid crystal display panel 15A so that the enlargement target portion is not changed according to the continuous proximity manipulation.

Here, even though it is determined that the proximity movement manipulation is transited to the continuous proximity manipulation in this way, thereafter, the control section 20 compares the inter-center distance with the movement manipulation detection distance whenever the area detection process is performed.

As a result, if the inter-center distance is equal to or longer than the movement manipulation detection distance, the control section 20 determines that the proximity manipulation which is being performed for the first manipulation surface is again transited from the continuous proximity manipulation to the proximity movement manipulation.

In this way, if the continuous proximity manipulation is performed once for the first manipulation surface, thereafter, the control section 20 appropriately enables the continuous proximity manipulation and the proximity movement manipulation to be alternately performed.

Further, even though it is determined that the continuous proximity manipulation is performed, if all the proximity areas are not thereafter detected through the continuous proximity manipulation without detecting the touch area when the area detection process is performed, the control section 20 determines that the manipulation body is at a distance beyond the proximity detection distance range from the first manipulation surface.

That is, at this time, the control section 20 determines that the continuous proximity manipulation which is performed for the first manipulation surface is terminated. Accordingly, at this time, the control section 20 also returns a display of the second liquid crystal display panel 15A to the state before the enlarged image is displayed.

Further, in a case where it is determined that the proximity movement manipulation is performed, if all the proximity areas are not thereafter detected through the proximity movement manipulation without detecting the touch area when the area detection process is performed, the control section 20 also determines that the manipulation body is at a distance beyond the proximity detection distance range from the first manipulation surface.

That is, at this time, the control section 20 determines that the proximity movement manipulation which has been performed for the first manipulation surface is terminated. Accordingly, at this time, the control section 20 returns a display of the second liquid crystal display panel 15A to the state before the enlarged image is displayed.

In this way, by appropriately performing the continuous proximity manipulation or the proximity movement manipulation for the first manipulation surface, the control section 20 can enlarge part of the image which is being displayed on the first liquid crystal display panel 14A and display it on the second liquid crystal display panel 15A.

However, if the indication item enlarged from the original size is included in the enlarged image displayed on the second liquid crystal display panel 15A, the control section 20 detects the display area of the indication item in the second liquid crystal display panel 15A as coordinates of the image position.

Further, the control section 20 matches the display area of the detected indication item with a command allocated to the indication item.

If the proximity movement manipulation is performed to change the enlargement target portion, and thus the display area of the indication item is displaced, the control section 20 changes the display area matched with the command allocated to the indication item to a display area after transition.

Thus, if it is detected that the tap manipulation is performed on the second manipulation surface of the second touch panel 15B in a state where the enlarged image is displayed on the second liquid crystal display panel 15A, the control section 20 detects a display area including the tap indication position from within the display area of the indication item.

Further, on the basis of the detected display area, the control section 20 determines that the command matched with the display area is a command input by the tap manipulation performed on the second manipulation surface of the second touch panel 15B at this time.

In this way, if it is determined that the command matched with the display area is the command input by the tap manipulation on the second manipulation surface of the second touch panel 15B, the control section 20 performs a process according to the determined command.

Here, if the command input by the tap manipulation at this time is a command indicating a process which does not involve switching of the image to be displayed, the control section 20 performs the process according to the command in a state where the enlarged image is displayed on the second liquid crystal display panel 15A.

On the other hand, if the command input by the tap manipulation is a command indicating a process which involves switching of the image to be displayed, the control section 20 performs the process according to the command and displays a different image obtained according to the process without enlargement on the second liquid crystal display panel 15A, instead of the enlarged image.

For example, if the command input by the tap manipulation at this time is a command for obtaining the above-described page data, the control section 20 displays the web browser image and the page image on the second liquid crystal display panel 15A without enlargement while receiving the page data from a server.

Further, if a sliding manipulation is performed for the manipulation surface of the second touch panel 15B in a state where another image is displayed on the second liquid crystal display panel 15A in this way, accordingly, the control section 20 appropriately scrolls the different image displayed on the second liquid crystal display panel 15A.

Thus, even in a case where the entire different image is unable to be displayed for the second liquid crystal display panel 15A, the control section 20 can display the entire different image.

In this way, in a state where the different image is displayed on the second liquid crystal display panel 15A without enlargement instead of the enlarged image, if the continuous proximity manipulation or the proximity movement manipulation performed for the first manipulation surface is terminated, the control section 20 returns the display of the second liquid crystal display panel 15A to the original state.

That is, at this time, instead of the different image, the control section 20 again displays the image which has been displayed immediately before the continuous proximity manipulation or the proximity movement manipulation is performed, on the second liquid crystal display panel 15A.

Further, while the continuous proximity manipulation or the proximity movement manipulation is being performed for the first manipulation surface, even though the manipulation body is in touch with an area in the first manipulation surface, which is different from the proximity area through the continuous proximity manipulation or the proximity movement manipulation, the control section 20 does not perform the detection of the type of the touch manipulation.

Thus, while the continuous proximity manipulation or the proximity movement manipulation is being performed for the first manipulation surface, even though the manipulation body is mistakenly in touch with the first manipulation surface, the control section 20 prevents a different image from being displayed, instead of the image which is being displayed, on the first liquid crystal display panel 14A due to the mistaken touch.

That is, while the continuous proximity manipulation or the proximity movement manipulation is being performed for the first manipulation surface, even though the manipulation body is mistakenly in touch with the first manipulation surface, the control section 20 prevents the continuous proximity manipulation or the proximity movement manipulation from being carelessly stopped due to the mistaken touch.

However, when the panel output signal is obtained from the second touch panel 15B to detect the proximity area and the center position in the area detection process, the control section 20 also performs the same process as the process for detecting the type of the proximity manipulation performed for the first manipulation surface.

Thus, the control section 20 can detect that the continuous proximity manipulation or the proximity movement manipulation is performed for the second manipulation surface of the second touch panel 15B.

Further, if the continuous proximity manipulation or the proximity movement manipulation is performed for the second manipulation surface of the second touch panel 15B, the control section 20 detects the enlargement target portion in the image which is being displayed on the second liquid crystal display panel 15A, by performing the above-described process.

Further, at this time, as described above, the control section 20 enlarges the enlargement target portion and displays the obtained enlarged image on the first liquid crystal display panel 14A.

In this way, even though the continuous proximity manipulation or the proximity movement manipulation is performed for the second manipulation surface of the second touch panel 15B, accordingly, the control section 20 can display the enlarged enlargement target portion on the first liquid crystal display panel 14A.

Further, if the tap manipulation is performed on the first manipulation surface of the first touch panel 14B in a state where the enlarged image is displayed on the first liquid crystal display panel 14A, the control section 20 appropriately switches the image to be displayed on the first touch panel 14B as described above.

Further, since the control section 20 can perform the proximity manipulation for the second manipulation surface of the second touch panel 15B in this way, for example, a user can appropriately perform the proximity manipulation to display the enlarged image while showing a display surface in a normal posture to a different user who faces the user.

Further, if a different image is displayed on the first liquid crystal display panel 14A instead of the enlarged image and the tap manipulation or the sliding manipulation is performed on the first manipulation surface of the first touch panel 14B, the control section 20 appropriately switches the image displayed on the first touch panel 14B as described above and scrolls it.

[1-2-4. Display Control Process Routine]

Next, a display control process routine RT1, which enlarges part of an image in response to a proximity manipulation performed over the first manipulation surface of the first touch panel 14B or the second manipulation surface of the second touch panel 15B by the control section 20 and displays it, will be described with reference to FIGS. 21 and 22.

Figure 21:
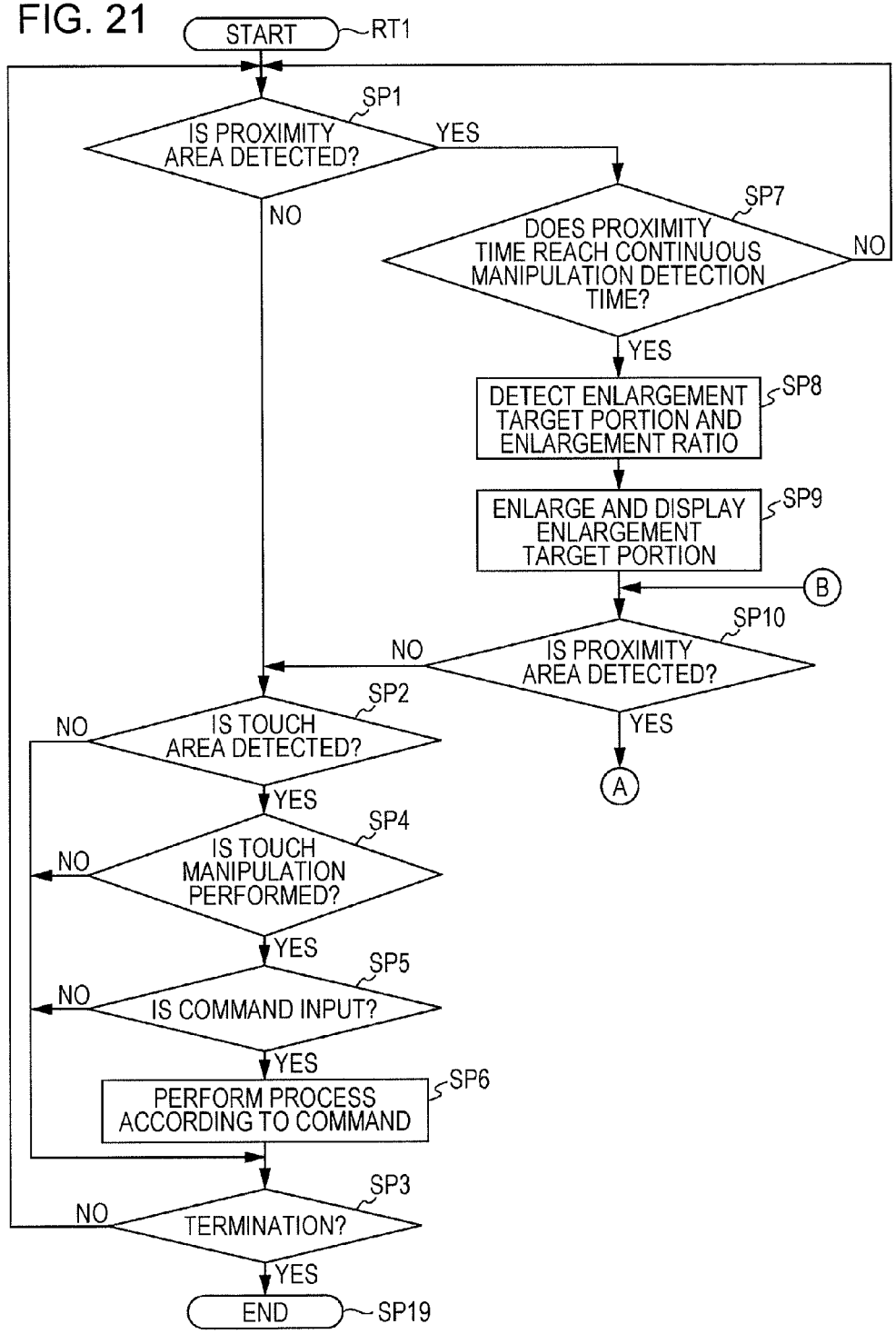
FIG. 21 is a flowchart illustrating a display control process routine (1)
Figure 22:
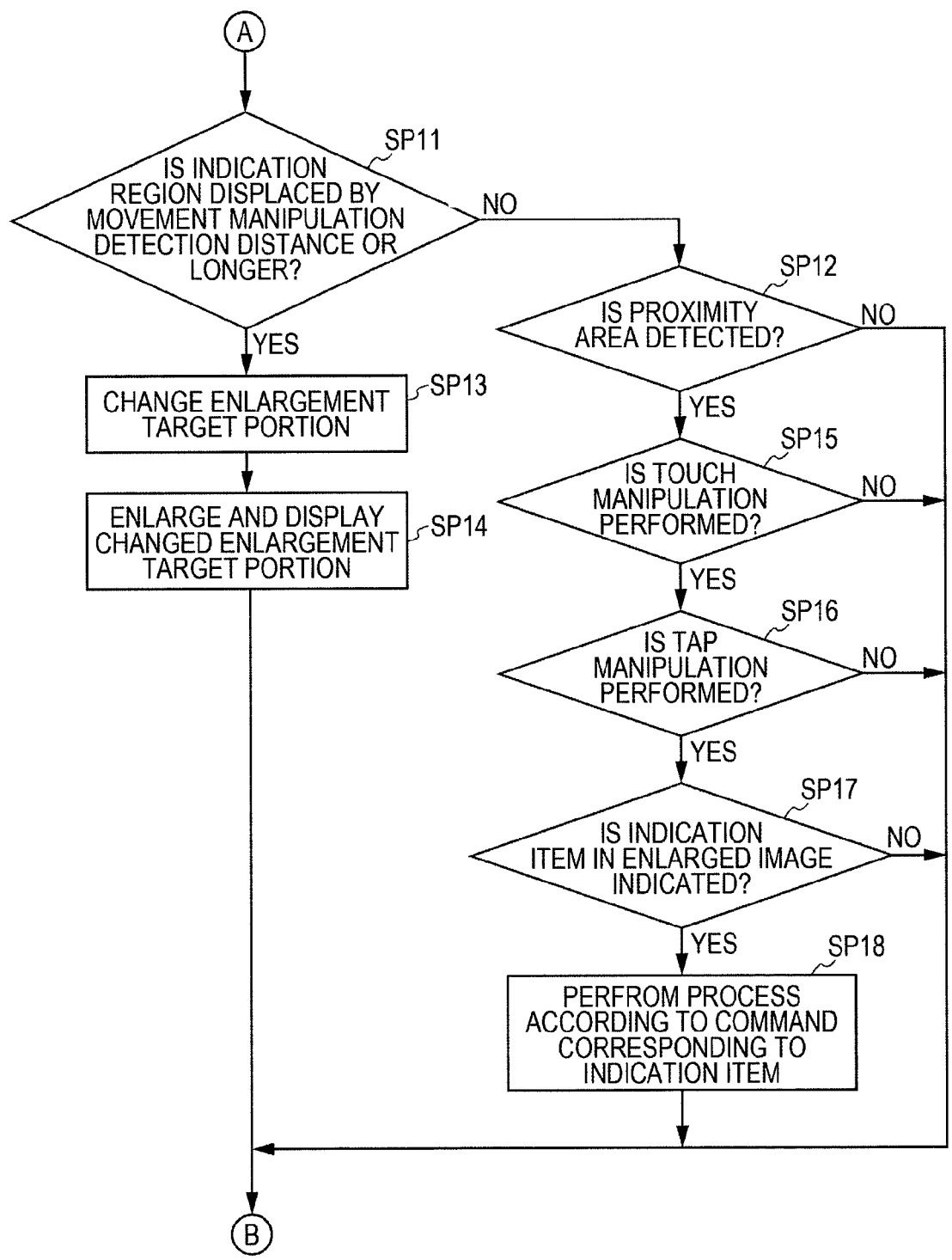
FIG. 22 is a flowchart illustrating a display control process routine (2)

For example, if the mobile terminal 10 starts up and an image is displayed on the first liquid crystal display panel 14A or the second liquid crystal display panel 15A, the control section 20 starts the display control process routine RT1 shown in FIGS. 21 and 22 according to a display control program which is stored in advance in the non-volatile memory 21.

If the display control process routine RT1 is started, the control section 20 starts a regular area detection process and determines in step SP1 whether a proximity area is detected on the first manipulation surface of the first touch panel 14B or the second manipulation surface of the second touch panel 15B.

If a negative result is obtained in step SP1, this means that the manipulation body has not yet moved close to any one of the first manipulation surface and the second manipulation surface, or that the manipulation body once moves close to and then away from the manipulation surface. If such a negative result is obtained in step SP1, the control section 20 moves the routine to the next step SP2.

In step SP2, the control section 20 determines whether a touch area is detected on the first manipulation surface of the first touch panel 14B or the second manipulation surface of the second touch panel 15B.

If a negative result is obtained in step SP2, this means that the manipulation body is not in touch with any one of the first manipulation surface and the second manipulation surface. If such a negative result is obtained in step SP2, the control section 20 moves the routine to the next step SP3.

In step SP3, the control section 20 determines whether to terminate the display of the image on the first liquid crystal display panel 14A and the second liquid crystal display panel 15A.

If a negative result is obtained in step SP3, this means that an indication for display termination is not given and the image is still continuously displayed on the first liquid crystal display panel 14A or the second liquid crystal display panel 15A. If such a negative result is obtained in step SP3, the control section 20 returns the routine to step SP1.

Then, the control section 20 repeatedly performs the processes of steps SP1 to SP3 until a positive result is obtained in any one of steps SP1 to SP3.

Thus, the control section 20 waits for the proximity or touch of the manipulation body on the first manipulation surface of the first touch panel 14B or the second manipulation surface of the touch panel 15B and termination of the image display.

On the other hand, if a positive result is obtained in step SP2, this means that the manipulation body is in touch with the first manipulation surface of the first touch panel 14B or the second manipulation surface of the second touch panel 15B and there is a possibility that the touch manipulation is started. If such a positive result is obtained in step SP2, the control section 20 moves the routine to the next step SP4.

In step SP4, the control section 20 determines whether a touch manipulation is performed on the first manipulation surface or the second manipulation surface.

If a negative result is obtained in step SP4, this means, for example, that the manipulation body is in touch with a plurality of locations of the first manipulation surface or the second manipulation surface and the tap manipulation or sliding manipulation as the touch manipulation is not performed. If such a negative result is obtained in step SP4, the control section 20 returns the routine to step SP3.

On the other hand, if a positive result is obtained in step SP4, this means that the manipulation body is in touch with one location of the first manipulation surface or the second manipulation surface and there is a possibility that the tap manipulation or sliding manipulation as the touch manipulation is performed. If such a positive result is obtained in step SP4, the control section 20 moves the routine to the next step SP5.

In step SP5, the control section 20 determines whether a command is input by the touch manipulation. If a negative result is obtained in step SP5, this means that the determination of whether the touch manipulation is the tap manipulation or the sliding manipulation is not yet completed, for example.

Alternatively, if the negative result is obtained in step SP5, this means, for example, that part of the image being displayed on the first liquid crystal display panel 14A or the second liquid crystal display panel 15A, which is different from the display area of the indication item, is indicated by the tap manipulation. If such a negative result is obtained in step SP5, the control section 20 returns the routine to step SP3.

On the other hand, if a positive result is obtained in step SP5, this means that the display area of the indication item in the image being displayed is indicated by the tap manipulation performed on the first manipulation surface or the second manipulation surface and a command corresponding to the indication item is input.

Alternatively, if the positive result is obtained in step SP5, this means that a scroll command for the image being displayed is input by the sliding manipulation performed on the first manipulation surface or the second manipulation surface. If such a positive result is obtained in step SP5, the control section 20 moves the routine to the next step SP6.

In step SP6, the control section 20 performs a process according to the command input by the tap manipulation or the sliding manipulation, and then returns the routine to step SP3.

In this way, the control section 20 appropriately switches the image displayed on the first liquid crystal display panel 14A or the second liquid crystal display panel 15A and appropriately changes a displayed portion of the image.

On the other hand, if a positive result is obtained in the above-described step SP1, this means that the manipulation body moves close to one of the first manipulation surface of the first touch panel 14B and the second manipulation surface of the second touch panel 15B.

If such a positive result is obtained in step SP1, the control section 20 determines that the proximity manipulation is started, and starts measurement of the proximity time. Then, the control section 20 moves the routine to the next step SP7.

In step SP7, the control section 20 compares the proximity time with the continuous manipulation detection time, and determines whether the proximity time reaches the continuous manipulation detection time.

If a negative result is obtained in step SP7, this means that the proximity time has not yet reached the continuous manipulation detection time. If such a negative result is obtained in step SP7, the control section 20 returns the routine to step SP1.

Thus, the control section 20 waits until the proximity time reaches the continuous manipulation detection time by sequentially and repeatedly performing the processes of steps SP1 to SP7 while the manipulation body is close to the first manipulation surface or the second manipulation surface.

On the other hand, if a positive result is obtained in step SP7, this means that a continuous proximity manipulation as the proximity manipulation is performed for one of the first manipulation surface and the second manipulation surface. If such a positive result is obtained in step SP7, the control section 20 moves the routine to the next step SP8.

In step SP8, the control section 20 detects an indication region indicated by the continuous proximity manipulation and the area of the indication region.

Further, the control section 20 detects an enlargement target portion in the image being displayed on one of the first liquid crystal display panel 14A and the second liquid crystal display panel 15A on the basis of the indication region and its area, and detects an enlargement ratio with respect to the enlargement target portion. Then, the control section moves the routine to the next step SP9.

In step SP9, the control section 20 enlarges the enlargement target portion at the enlargement ratio according to the area of the indication region, and displays it on the other of the first liquid crystal display panel 14A and the second liquid crystal display panel 15A. Then, the control section 20 moves the routine to the next step SP10.

In step SP10, the control section 20 determines whether the proximity area by means of the proximity manipulation (in this case, continuous proximity manipulation) is traced and detected.

If a positive result is obtained in step SP10, this means that the manipulation body is still close to one of the first manipulation surface and the second manipulation surface. If such a positive result is obtained in step SP10, the control section 20 moves the routine to the next step SP11.

In step SP11, the control section 20 detects again an indication region indicated by the continuous proximity manipulation and determines whether this detected indication region is displaced by a movement manipulation detection distance or further from the previously detected indication region.

If a negative result is obtained in step SP11, this means that the manipulation body is close to one of the first manipulation surface and the second manipulation surface while being hardly moved. If such a negative result is obtained in step SP11, the control section 20 moves the routine to step SP12.

In step SP12, the control section 20 determines whether the touch area is detected on the other of the first manipulation surface and the second manipulation surface.

If a negative result is obtained in step SP12, this means that the manipulation body is not in touch with the other of the first manipulation surface and the second manipulation surface. If such a negative result is obtained in step SP12, the control section 20 returns the routine to step SP10.

Then, the control section 20 repeatedly performs the processes of steps SP10 to SP12 until a negative result is obtained in step SP10 or a positive result is obtained in any one of steps SP11 and SP12.

Thus, the control section 20 waits for termination of the proximity manipulation or start of the proximity movement manipulation, and indication of the indication item in the enlarged image.

On the other hand, if a positive result is obtained in step SP11, this means that the proximity movement manipulation is performed over one of the first manipulation surface and the second manipulation surface, subsequent to the continuous proximity manipulation. If such a positive result is obtained in step SP11, the control section 20 moves the routine to the next step SP13.

In step SP13, the control section 20 detects the indication region indicated by the proximity movement manipulation and the area of the indication region.

Further, the control section 20 changes and detects the enlargement target portion in the image being displayed on one of the first liquid crystal display panel 14A and the second liquid crystal display panel 15A on the basis of the indication region and its area. Then, the control section 20 moves the routine to the next step SP14.

In step SP14, the control section 20 enlarges the enlargement target portion after change at an enlargement ratio according to the area of the indication region indicated by the continuous proximity manipulation and its area and displays it on the other of the first liquid crystal display panel 14A and the second liquid crystal display panel 15A. Then, the control section 20 returns the routine to step SP10.

Thus, the control section 20 changes the enlargement target portion in the image being displayed and enlarges the changed enlargement target portion to be displayed while the manipulation body which is close to one of the first manipulation surface and the second manipulation surface is moved while maintaining the proximity state.

Further, if a positive result is obtained in step SP12, this means that the manipulation body is in touch with the other of the first manipulation surface and the second manipulation surface and there is a possibility that a tap manipulation is started. If such a positive result is obtained in step SP12, the control section 20 moves the routine to the next step SP15.

In step SP15, the control section 20 determines whether a touch manipulation is performed on the other of the first manipulation surface and the second manipulation surface.

If a negative result is obtained in step SP15, this means, for example, that the manipulation body is in touch with a plurality of locations in the other of the first manipulation surface and the second manipulation surface but the touch manipulation is not performed. If such a negative result is obtained in step SP15, the control section 20 returns the routine to step SP10.

On the other hand, if a positive result is obtained in step SP15, this means that the manipulation body is in touch with a single location in the other of the first manipulation surface and the second manipulation surface and the touch manipulation is performed.

If such a positive result is obtained in step SP15, the control section 20 starts measurement of the touch time, and then moves the routine to the next step SP16.

In step SP16, the control section 20 determines whether the touch manipulation performed on the other of the first manipulation surface and the second manipulation surface at this time is a tap manipulation.

If a negative result is obtained in step SP16, this means that the touch time is in the middle of being measured in a tap detection time and the determination concerning whether the touch manipulation is the tap manipulation is not yet terminated.

Alternatively, if the negative result is obtained in step SP16, this means that the touch time being measured exceeds the tap detection time and thus the manipulation body is mistakenly in touch with the other of the first manipulation surface and the second manipulation surface at this time. If such a negative result is obtained in step SP16, the control section 20 returns the routine to step SP10.

On the other hand, if a positive result is obtained in step SP16, this means that the manipulation body is in touch with nearly a single point in the other of the first manipulation surface and the second manipulation surface within the tap detection time and then is disengaged from it immediately thereafter. If such a positive result is obtained in step SP16, the control section 20 moves the routine the next step SP17.

In step SP17, the control section 20 determines whether a display area of the indication item in the enlarged image is indicated by the tap manipulation.

If a negative result is obtained in step SP17, this means that a portion which is different from the display area of the indication item in the enlarged image is indicated by the tap manipulation and the manipulation body is mistakenly in touch with the other of the first manipulation surface and the second manipulation surface at this time. If such a negative result is obtained in step SP17, the control section 20 returns the routine to step SP10.

On the other hand, if a positive result is obtained in step SP17, this means that the display area of the indication item in the enlarged image is indicated by the tap manipulation and a command corresponding to the indication item is input. If such a positive result is obtained in step SP17, the control section 20 moves the routine to the next step SP18.

In step SP18, the control section 20 performs a process for displaying a different image, instead of the enlarged image, on the other of the first liquid crystal display panel 14A and the second liquid crystal display panel 15A, for example, according to the command input as the indication item is indicated by the tap manipulation, and then returns the routine to step SP10.

In this way, the control section 20 appropriately changes the enlarged image displayed on the other of the first liquid crystal display panel 14A and the second liquid crystal display panel 15A together with the enlargement target portion, by sequentially performing the processes of steps SP10 to SP18. Then, the control section 20 performs a process according to the indication item in the enlarged image.

Further, if a negative result is obtained in step SP10, this means that the manipulation body which has been in proximity to one of the first manipulation surface and the second manipulation surface moves away beyond the proximity detection distance range and the proximity manipulation is terminated.

If such a negative result is obtained in step SP10, the control section 20 returns the enlarged image displayed on the other of the first liquid crystal display panel 14A and the second liquid crystal display panel 15A to an image before the enlarged image is displayed, and then returns the routine to step SP2.

In this way, the control section 20 enlarges part of the image at an enlargement ratio according to the area of the indication region indicated by the continuous proximity manipulation and displays it, by performing the processes of steps SP1 to SP18 while the image is being displayed on the first liquid crystal display panel 14A or the second liquid crystal display panel 15A.

On the other hand, if a positive result is obtained in step SP3, this means that an indication is given so that the image display on the first liquid crystal display panel 14A and the second liquid crystal display panel 15A is terminated.

If such a positive result is obtained in step SP3, the control section 20 completely terminates the image display on the first liquid crystal display panel 14A and the second liquid crystal display panel 15A, and then moves the routine to the next step SP19. Then, in step SP19, the control section 20 terminates the display control process routine RT1.

[1-2-5. Operation and Effect of Embodiment]

In the above-described configuration, if the continuous proximity manipulation is performed for the surface (first or second manipulation surface) of one of the first touch screen 14 and the second touch screen 15 on which the image is displayed, the control section 20 of the mobile terminal detects the indication region through the continuous proximity manipulation and its area.

Further, the control section 20 detects the enlargement target portion which is part of the image being displayed on one of the first touch screen 14 and the second touch screen 15 on the basis of the indication region and the area, and detects the enlargement ratio for the enlargement target portion on the basis of the area of the indication region.

Then, the control section 20 enlarges the enlargement target portion at an enlargement ratio according to the area of the indication region and displays it on the other of the first touch screen 14 and the second touch screen 15.

Thus, the control section 20 can allow a desired enlargement target portion to be selected by the indication region according to the continuous proximity manipulation, for example, by arbitrarily changing the number of fingers which are the manipulation body, intervals of the individual fingers or the like when the continuous proximity manipulation is performed.

Further, at this time, the control section 20 can arbitrarily select the area of the indication region through the continuous proximity manipulation and the enlargement ratio for the enlargement target portion by arbitrarily changing the number of fingers which are the manipulation body, intervals of the individual fingers or the like when the continuous proximity manipulation is performed.

That is, the control section 20 can easily select the enlargement target portion in the image and a desired enlargement ratio for the enlargement target portion by the continuous proximity manipulation by arbitrarily adjusting the size of the proximity area by means of the continuous proximity manipulation, the number of proximity areas, the positional relationship between the plurality of proximity areas, or the like.

Further, the control section 20 can enlarge the enlargement target portion in the image being displayed on one of the first touch screen 14 and the second touch screen15 with a desired size at the selected enlargement ratio, and can display it on the other of the first touch screen 14 and the second touch screen 15.

According to the above-described configuration, when the continuous proximity manipulation is performed for the surface of one of the first touch screen 14 and the second touch screen 15 by the manipulation body, the control section 20 of the mobile terminal 10 detects the area of the indication region indicated by the continuous proximity manipulation and enlarges the enlargement target portion which is part of the image at the enlargement ratio according to the detected area of the indication region to be displayed on the other of the first touch screen 14 and the second touch screen 15.

Thus, the control section 20 of the mobile terminal 10 can easily select part of the image which is the enlargement target portion by the continuous proximity manipulation and a desired enlargement ratio for the part of the image and can enlarge the part of the image with a desired size to be displayed on the other of the first touch screen 14 and the second touch screen 15. Accordingly, the control section 20 of the mobile terminal 10 can significantly enhance usability of the mobile terminal 10.

If the proximity movement manipulation is performed for the surface of one of the first touch screen 14 and the second touch screen 15 on which the image is being displayed in succession to the continuous proximity manipulation, the control section 20 of the mobile terminal 10 changes the enlargement target portion in the image.

Further, the control section 20 of the mobile terminal 10 enlarges the changed enlargement target portion and displays it on the other of the first touch screen 14 and the second touch screen 15, instead of the previous enlargement target portion.

Thus, the control section 20 of the mobile terminal 10 can easily change and enlarge the enlargement target portion of the image to be displayed, through a simple manipulation for moving the manipulation body which has been in proximity to one of the first manipulation surface and the second manipulation surface while maintaining the proximity state, without repeatedly performing the continuous proximity manipulation.

Further, if the continuous proximity manipulation or the proximity movement manipulation is performed for the surface of one of the first touch screen 14 and the second touch screen 15, the control section 20 of the mobile terminal 10 displays part of the image displayed thereon on the other of the first touch screen 14 and the second touch screen 15.

Thus, the control section 20 of the mobile terminal 10 can show the enlarged image without any interruption due to the manipulation body which performs the continuous proximity manipulation or the proximity movement manipulation.

Further, the control section 20 of the mobile terminal 10 enlarges part of the image according to the continuous proximity manipulation or the proximity movement manipulation performed by moving the manipulation body close to the surface of one of the first touch screen 14 and the second touch screen 15 while maintaining the proximity without touch, and displays it.

Thus, the control section 20 of the mobile terminal 10 can allow the enlargement ratio for part of the image and the enlargement display to be indicated by an intuitive manipulation which is the same as a touch manipulation, which is obviously distinguished from the touch manipulation such as a tap manipulation or sliding manipulation.

2. Modified Embodiments

[2-1. First Modified Embodiment]

In the above-described embodiment, from among values of the enlargement ratio which is in inverse proportion to the size of the area of the indication region detected according to the continuous proximity manipulation, in which the values become smaller as the area becomes larger, an enlargement ratio for enlarging the enlargement target portion is detected according to the area. Further, in the above-described embodiment, the enlargement target portion is enlarged at the detected enlargement ratio.

However, the present invention is not limited thereto. For example, from among values of the enlargement ratio which is in proportion to the size of the area of the indication region detected according to the continuous proximity manipulation, in which the values become larger as the area becomes larger, the enlargement ratio for enlarging the enlargement target portion is detected according to the area. Further, in this modified embodiment, the enlargement target portion may be enlarged at the detected enlargement ratio.

According to such a configuration, in this modified embodiment, if an indication region of a relatively small area is indicated as a single finger which is an example of the manipulation body moves close to the first manipulation surface of the first touch panel 14B or the second manipulation surface of the second touch panel 15B, it is possible to select an enlargement ratio of a small value.

Further, according to such a configuration, in this modified embodiment, if an indication region of a relatively large area is indicated as a plurality of fingers which is an example of the manipulation body moves close to the first manipulation surface or the second manipulation surface with these fingers being put together or separated from each other, it is possible to select an enlargement ratio of a large value.

In other words, according to such a configuration, in this modified embodiment, since the enlargement ratio is increased as the area of the indication region indicated by moving the manipulation body close to the first manipulation surface or the second manipulation surface is increased, it is possible to intuitively recognize and select the value of the enlargement ratio by the area of the indication region.

In the case of such a configuration, in this modified embodiment, enlargement ratios having different values may correspond to a plurality of areas, respectively, in a similar way to the above-described embodiment.

However, in this modified embodiment, for example, the plurality of areas, which ranges from the minimum area to the maximum area, is sequentially divided into a specific range, and a single enlargement ratio having a different value corresponds to each specific range.

Further, in this modified embodiment, when an indication region having an area of the specific range is detected, even though the area is any area within the specific range, the enlargement target portion may be uniformly enlarged at a single enlargement ratio corresponding to the specific range.

[2-2. Second Modified Embodiment]

In the above-described embodiment, if the continuous proximity manipulation or the proximity movement manipulation is performed for the first manipulation surface of the first touch panel 14B or the second manipulation surface of the second touch panel 15B, the indication region and the area of the indication region are detected.

Further, in the above-described embodiment, a rectangular portion in the image having the same area as the area of the indication region and having the same aspect ratio as an aspect ratio of the display surface is used as the enlargement target portion, and the enlargement target portion is enlarged.

However, the present invention is not limited thereto. For example, if the continuous proximity manipulation or the proximity movement manipulation is performed for the first manipulation surface or the second manipulation surface, the indication region itself in the image or a portion therein having a variety of shapes such as a square shape, circular shape or the like, which has the same area as the area of the indication region, is used as the enlargement target portion.

Further, in this modified embodiment, the enlargement target portion may be enlarged at an enlargement ratio according to the area of the indication region. With such a configuration, in this modified embodiment, it is also possible to obtain the same effect as that of the above-described embodiment.

Further, in this modified embodiment, if the continuous proximity manipulation or the proximity movement manipulation is performed for the first manipulation surface or the second manipulation surface, a portion having a specific size in the image is used as the enlargement target portion, regardless of the area of the indication region.

Further, in this modified embodiment, a center position of the portion of the specific size is matched with a center position of the indication region, and the portion of the specific size is used as the enlargement target portion.

In this modified embodiment, in a case where the size of the enlargement target portion is constantly maintained, the enlargement target portion may employ a variety of shapes such as a rectangular shape having the same aspect ratio as the aspect ratio of the display surface, square shape, circular shape or the like.

Further, in this modified embodiment, the enlargement target portion may be enlarged at an enlargement ratio according to the area of the indication region. Accordingly, with such a configuration, in this modified embodiment, it is possible to obtain the same effect as in the above-described embodiment.

In addition, in this modified embodiment, if the continuous proximity manipulation or the proximity movement manipulation is performed for the first manipulation surface or the second manipulation surface, a portion having a predetermined shape such as a square shape, circular shape or the like, which has the same area as the area of the proximity area in the image, is used as the enlargement target portion.

In this modified embodiment, at this time, if only one proximity area is detected, the portion of the predetermined shape having the same area as the area of the detected one proximity area is used as the enlargement target portion.

Further, in this modified embodiment, at this time, if the plurality of proximity areas is detected, a portion of a predetermined shape having the same area as a total area of the plurality of proximity areas is used as the enlargement target portion.

Furthermore, in this modified embodiment, at this time, the center position of the portion of the predetermined shape is matched with the center position of the indication region, and the portion of the predetermined shape is used as the enlargement target portion.

Further, in this modified embodiment, the enlargement target portion may be enlarged at an enlargement ratio according to the area of the indication region. In this modified embodiment, with such a configuration, it is possible to obtain the same effect as in the above-described embodiment.

However, in this modified embodiment, the enlargement target portion set by these various methods may be enlarged with a constant enlargement ratio which is set in advance, instead of being enlarged at the enlargement ratio according to the area of the indication region.

According to such a configuration, in this modified embodiment, even though the enlargement ratio of the enlargement target portion is constant, it is possible to arbitrarily select the position and size (that is, area) of the enlargement target portion, and to enlarge a desired portion in the image. Accordingly, with such a configuration, in this modified embodiment, it is also possible to significantly enhance usability of the mobile terminal.

Further, in this modified embodiment, it is possible to appropriately switch the enlargement ratio according to the area of the indication region and such a constant enlargement ratio at which the enlargement target portion is enlarged.

According to such a configuration, in this modified embodiment, it is possible to allow a user to arbitrarily select the method of image enlargement, and to further enhance usability of the mobile terminal.

In addition, in this modified embodiment, the second modified embodiment with respect to the size and shape of the enlargement target portion or its enlargement ratio may be combined with the configuration of the first modified embodiment with respect to the enlargement ratio corresponding to the above-described area.

[2-3. Third Modified Embodiment]

In the above-described embodiment, if the continuous proximity manipulation or the proximity movement manipulation is performed for the first manipulation surface of the first touch panel 14B or the second manipulation surface of the second touch panel 15B, the indication region and the area of the indication region are detected.

Further, in the above-described embodiment, the center position of the rectangular frame, in the image, having the same aspect ratio as the aspect ratio of the display surface is overlapped to be matched with the position facing the center position of the indication region, and the portion inside the frame is used as the enlarged target portion.

However, the present invention is not limited thereto. For example, if the continuous proximity manipulation or the proximity movement manipulation is performed for the first manipulation surface or the second manipulation surface, regardless of the center position of the indication region, a same portion such as a center portion in the image may be used as the enlargement target portion, for example.

Further, in this modified embodiment, in a case where the same portion in the image is used as the enlargement target portion all the time regardless of the center position of the indication region, for example, the enlargement target portion may be appropriately indicated and set according to the touch manipulation such as a tap manipulation or sliding manipulation for the first manipulation surface or the second manipulation surface.

In addition, in this modified embodiment, if the continuous proximity manipulation or the proximity movement manipulation is performed for the first manipulation surface or the second manipulation surface, the enlargement is performed at the enlargement ratio according to the area of the indication region using the entire image as the enlargement target portion.

Further, in this modified embodiment, at this time, by matching the center position of the enlarged image with the center position of the display surface, or by matching the center position of the indication region with the center position of the enlarged image, the enlarged image may be displayed.

Furthermore, in this modified embodiment, the configuration of the third modified embodiment with respect to the image enlargement may be combined with the configuration of at least one of the above-described first modified embodiment and second modified embodiment.

[2-4. Fourth Modified Embodiment]

In the above-described embodiment, the first touch screen 14 and the second touch screen 15 are installed in the mobile terminal 10.

Further, in the above-described embodiment, according to the proximity manipulation for one of the first touch screen 14 and the second touch screen 15, part of the image is enlarged and displayed on the other of the first touch screen 14 and the second touch screen 15.

However, the present invention is not limited thereto. As shown in FIG. 23, for example, one touch screen 51 having the same configuration as that of the above-described first touch screen 14 or second touch screen 15 is installed in a mobile terminal 50.

Further, in this modified embodiment, if the proximity manipulation is performed for a surface of the touch screen 51 in the mobile terminal 50, part of the image 52 may be enlarged at an enlargement ratio according to the area of the indication region to be displayed on the touch screen 51, instead of the image 52 displayed thus far.

Further, in this modified embodiment, in a case where the enlarged image 53 is displayed on the touch screen 51 in the mobile terminal 50, even though the manipulation body moves away from the proximity detection distance range from the touch screen 51, the display of the enlarged image 53 is maintained.

Furthermore, in this modified embodiment, if a specific type of proximity manipulation or touch manipulation is performed for the surface of the touch screen 51, in a state where the enlarged image 53 is displayed on the touch screen 51 in the mobile terminal 50, the original image 52 may be displayed instead of the enlarged image 53.

Further, in this modified embodiment, in a case where the enlarged image is displayed on one of the first touch screen 14 and the second touch screen 15, the display of the enlarged image is maintained even though the manipulation body moves away from the other of the first touch screen 14 and the second touch screen 15.

Further, in this modified embodiment, in a state where the enlarged image is displayed, if a specific type of proximity manipulation or touch manipulation is performed on the surface of one or the other of the first touch screen 14 and the second touch screen 15, the display may return to the original state.

Further, in this modified embodiment, at least one touch panel is separately installed in the mobile terminal without being integrated with at least one liquid crystal display panel.

In addition, in this modified embodiment, if the proximity manipulation is performed for the manipulation surface of the touch panel, part of the image may be enlarged and displayed on the liquid crystal display panel, at an enlargement ratio according to the area of the indication region indicated by the proximity manipulation.

In this modified embodiment, the configuration of the fourth modified embodiment with respect to the mobile terminal may be combined with the configuration of at least one of the above-described first modified embodiment, second modified embodiment and third modified embodiment.

[2-5. Fifth Modified Embodiment]

Further, in the above-described embodiment, while the continuous proximity manipulation is being performed for the first manipulation surface of the first touch panel 14B or the second manipulation surface of the second touch panel 15B, the enlargement target portion of the image is enlarged and displayed at an enlargement ratio indicated by the continuous proximity manipulation.

However, the present invention is not limited thereto. For example, while the continuous proximity manipulation is being performed for the first manipulation surface or the second manipulation surface, the area of the indication region is detected whenever the area detection process is performed every time or once per every predetermined number of times.

Further, in this modified embodiment, while the continuous proximity manipulation is being performed, whenever the area of the indication region is detected, the enlargement ratio according to the area is detected to update the enlargement ratio used for enlargement of the enlargement target portion into the detected enlargement ratio.

In this way, in this modified embodiment, while the continuous proximity manipulation is being performed, the enlargement target portion of the image is appropriately enlarged and displayed at the updated enlargement ratio.

Further, in this modified embodiment, while the proximity movement manipulation is being performed for the first manipulation surface or the second manipulation surface, similarly, the area of the indication region is detected whenever the area detection process is performed every time or once per every predetermined number of times.

In addition, in this modified embodiment, while the proximity movement manipulation is being performed, whenever the area of the indication region is detected, the enlargement ratio according to the area is detected to update the enlargement ratio used for enlargement of the enlargement target portion into the detected enlargement ratio.

In this way, in this modified embodiment, while the proximity movement manipulation is being performed, similarly, the enlargement target portion of the image is appropriately enlarged and displayed at the updated enlargement ratio.

In this modified embodiment, with such a configuration, by changing the distance between the first manipulation surface or the second manipulation surface and the manipulation body during the proximity manipulation, it is possible to freely change the enlargement ratio and to enlarge the enlargement target portion.

In addition, in this modified embodiment, while the continuous proximity manipulation is being performed for the first manipulation surface or the second manipulation surface, the area of the indication region may be detected whenever the area detection process is performed every time or once per every predetermined number of times, as well as the enlargement ratio, and the size of the enlargement target portion may be changed on the basis of the area.

Further, in this modified embodiment, even while the proximity movement manipulation is being performed for the first manipulation surface or the second manipulation surface, similarly, the area of the indication region may be detected whenever the area detection process is performed every time or once per every predetermined number of times, and the size of the enlargement target portion may be changed according to the area.

With such a configuration, in this modified embodiment, by changing the distance between the first manipulation surface or the second manipulation surface and the manipulation body even during the proximity manipulation, it is possible to freely change the size of the enlargement target portion as if zoom is performed, and to enlarge the enlargement target portion.

Further, in this modified embodiment, the change in the enlargement ratio may be combined with the change in the size of the enlargement target portion.

However, in this modified embodiment, the configuration of the fifth modified embodiment with respect to the update of the enlargement ratio may be combined with the configuration of at least one of the above-described first modified embodiment, second modified embodiment, third modified embodiment and fourth modified embodiment.

[2-6. Sixth Modified Embodiment]

Further, in the above-described embodiment, according to the continuous proximity manipulation or the proximity movement manipulation performed for the first manipulation surface of the first touch panel 14B or the second manipulation surface of the second touch panel 15B, the enlargement target portion of the image is enlarged and displayed.

However, the present invention is not limited thereto. For example, the enlargement target portion of the image may be enlarged and displayed according to the touch manipulation such as a tap manipulation or a sliding manipulation performed for the first manipulation surface or the second manipulation surface.

That is, in this modified embodiment, the indication region and its area may be detected according to the tap manipulation performed by, for example, one or plural fingers, for the first manipulation surface or the second manipulation surface, and the enlargement target portion of the image may be enlarged and displayed at an enlargement ratio according to the area.

Further, in this modified embodiment, the indication region and its area may be detected according to the sliding manipulation performed to surround a desired portion as the indication region by, for example, one finger, to the first manipulation surface or the second manipulation surface, and the enlargement target portion of the image may be enlarged and displayed at an enlargement ratio according to the area.

Further, in this modified embodiment, the indication region and its area may be detected according to the touch manipulation performed to bring, for example, one or plural fingers in touch with the first manipulation surface or the second manipulation surface for a predetermined time or longer, and the enlargement target portion of the image may be enlarged and displayed at an enlargement ratio according to the area.

However, in this modified embodiment, if the continuous proximity manipulation is performed for the first manipulation surface or the second manipulation surface to detect the indication region and its area, it may be thereafter considered that the continuous proximity manipulation is being performed even though the manipulation body is in touch with the first manipulation surface or the second manipulation surface.

That is, in this modified embodiment, while the continuous proximity manipulation is being performed, even though the manipulation body is in touch with the first manipulation surface or the second manipulation surface to detect the touch area, the touch area is handled as the proximity area to detect the indication region.

Further, in this modified embodiment, the display of the enlarged image for one of the first liquid crystal display panel 14A and the second liquid crystal display panel 15A may be continued.

Furthermore, in this modified embodiment, after the continuous proximity manipulation is performed for the first manipulation surface or the second manipulation surface to detect the indication region and its area, even though the manipulation body is in touch with the first manipulation surface or the second manipulation surface in the continuously performed proximity movement manipulation, it may be considered that the proximity movement manipulation is being performed.

That is, in this modified embodiment, while the proximity movement manipulation is being performed, even though the manipulation body is in touch with the first manipulation surface or the second manipulation surface to detect the touch area, the touch area is handled as the proximity area to detect the indication region.

Further, in this modified embodiment, the display of the enlarged image for one of the first liquid crystal display panel 14A and the second liquid crystal display panel 15A may be continued.

Further, in this modified embodiment, after the continuous proximity manipulation is performed for the first manipulation surface or the second manipulation surface to detect the indication region and its area, even though the manipulation body is continuously manipulated to be moved while being in touch with the first manipulation surface or the second manipulation surface, the manipulation may be considered as the proximity movement manipulation.

That is, in this modified embodiment, after the indication region and its area are detected according to the proximity movement manipulation, even though the touch area is detected until the manipulation body moves away from the proximity detection distance range from the first manipulation surface or the second manipulation surface, the touch area is handled as the proximity area to detect the indication region.

Further, in this modified embodiment, the display of the enlarged image for one of the first liquid crystal display panel 14A and the second liquid crystal display panel 15A may be continued.

With such a configuration, in this modified embodiment, even though the manipulation body is mistakenly in touch with the first manipulation surface or the second manipulation surface while the continuous proximity manipulation or the proximity movement manipulation is being performed, it is possible to prevent a process for enlarging and displaying the enlargement target portion from being carelessly stopped due to the touch.

However, in this modified embodiment, the configuration of the sixth modified embodiment with respect to the manipulation for enlarging and displaying the image may be combined with the configuration of at least one of the above-described first modified embodiment, second modified embodiment, third modified embodiment, fourth modified embodiment and fifth modified embodiment.

[2-7. Seventh Modified Embodiment]

Further, in the above-described embodiment, in a state where the proximity area and the touch area are not detected at all, if one proximity area is detected when the proximity is started, it is determined that the proximity manipulation is started, and then, it is detected whether the continuous proximity manipulation is performed.

However, the present invention is not limited thereto. For example, if one proximity area is detected when the proximity is started in a state where the proximity area and the touch area are not detected, it may be detected whether the continuous proximity manipulation is performed according to the detection situation of the proximity area thereafter, without determining the start of the proximity manipulation.

Further, hereinafter, with respect to the method of detecting whether such a continuous proximity manipulation is performed, a case where the manipulation body is in proximity to the first manipulation surface of the first touch panel 14B will be described as an example.

That is, if one proximity area is detected when the proximity is started in a state where the proximity area and the touch area are not detected at all, the control section 20 starts measurement of the proximity time by a timer.

Further, if a plurality of proximity areas is simultaneously detected when the proximity is started in a state where the proximity area and the touch area are not detected at all, the control section 20 starts measurement of the proximity time by the timer.

Further, if the measurement of the proximity time is started, the control section 20 continues to measure the proximity time until the proximity time reaches the continuous manipulation detection time at maximum.

Further, if one or plural proximity areas are detected when the proximity is started in this way, the control section 20 also starts detection of the movement trace of each finger which is an example of the manipulation body using the center position of the proximity area as a starting point of each movement trace.

Furthermore, for example, if one or plural fingers newly move close to the first manipulation surface to additionally detect one or plural proximity areas when the proximity is started until the proximity time reaches the continuous manipulation detection time, the control section 20 also uses the center position of the one or plural proximity areas as the starting point of each movement trace.

Further, in the case where one or plural proximity areas are additionally detected in this way, the control section 20 starts detection of the movement trace of each finger which is an example of the additionally detected manipulation body in a similar way.

Further, whenever the control section 20 detects the proximity area and its center position by performing the area detection process after one or plural proximity areas are detected when the proximity is started, the control section 20 sequentially traces the detected center position from the starting point (center position), to thereby detect the movement trace of each finger.

Further, even though one or plural fingers are disengaged from the first manipulation surface before the proximity time reaches the continuous manipulation detection time and the proximity area of the finger is not detected (even though the number of the detected proximity areas is decreased), if one or more proximity areas are still detected, the control section 20 continues to measure the proximity time.

Here, if all the proximity areas are unable to be detected before the proximity time reaches the continuous manipulation detection time (that is, if all the fingers which are an example of the manipulation body which are close to the first manipulation surface are deviated from the proximity detection distance range), the control section 20 terminates the measurement of the proximity time.

Further, if one or plural fingers come in touch with the first manipulation surface before the proximity time reaches the continuous manipulation detection time to detect one or plural touch areas, at this time, the control section 20 terminates the measurement of the proximity time, regardless of the presence or absence of the detection of the proximity area.

In this way, if the measurement of the proximity time is started, while at least one proximity area is being detected to be sequentially traced in a state where the touch area is not detected, the control section 20 continues to measure the proximity time.

That is, if the measurement of the proximity time is started, even though other fingers additionally move close to the first manipulation surface and deviate from the proximity detection distance range thereafter, while at least one finger is close thereto in a state where the finger is not in touch with the first manipulation surface, the control section 20 continues to measure the proximity time.

Further, if the measurement of the proximity time is terminated before the proximity time reaches the continuous manipulation detection time, at this time, the control section 20 determines that the proximity manipulation is not performed for the first manipulation surface.

On the other hand, if the measured proximity time reaches the continuous manipulation detection time, the control section 20 determines whether all movement traces which are continuously detected thus far fall within a range of the circle of a predetermined radius centering on the corresponding starting point (center position), for example.

Further, the range of the circle centering on the starting point is used for detecting whether the proximity manipulation is performed. Hereinafter, the range of the circle is referred to as a "proximity manipulation detection range". Further, the radius of the proximity manipulation detection range is determined in advance as a predetermined length which is equal to or shorter than 1 [mm], for example.

As a result, when the proximity time reaches the continuous manipulation detection time, if all the movement traces detected thus far extend outside the proximity manipulation detection range from the corresponding starting point, the control section 20 determines that the proximity manipulation is not performed for the first manipulation surface.

That is, even though the finger is not in touch with the first manipulation surface at all at the continuous manipulation detection time, if one or plural fingers are significantly displaced in positions, the control section 20 determines that the finger mistakenly moves close to the first manipulation surface and the proximity manipulation is not performed.

On the other hand, if at least one movement trace falls within the corresponding proximity manipulation detection range when the proximity time reaches the continuous manipulation detection time, the control section 20 determines that the continuous proximity manipulation as the proximity manipulation is performed for the first manipulation surface.

That is, if it is detected that the finger which is an example of the manipulation body is not in touch with the first manipulation surface and one or plural fingers barely change positions and is close to the first manipulation surface at the continuous manipulation detection time, the control section 20 determines that the continuous proximity manipulation is performed.

Thus, the control section 20 can obviously distinguish the continuous proximity manipulation from the touch manipulation such as a tap manipulation or a sliding manipulation and can detect that the continuous proximity manipulation is performed for the first manipulation surface.

Further, if it is detected that the continuous proximity manipulation is performed in this way, the control section 20 determines that all the proximity areas detected at the detection time (hereinafter, the time when it is detected that the continuous proximity manipulation is performed is referred to as "continuous manipulation detection time") are based on the current proximity manipulation.

Thus, even though the plurality of proximity areas starts to be detected through the plural fingers to be slightly shifted in terms of time until the proximity time reaches the continuous manipulation detection time, the control section 20 can detect the plurality of proximity areas as proximity areas by means of one proximity manipulation at the continuous manipulation detection time.

In this way, the control section 20 can detect that the continuous proximity manipulation is performed for the first manipulation surface, and can detect the indication region indicated by the continuous proximity manipulation in the first manipulation surface, on the basis of all the proximity areas detected at the continuous manipulation detection time.

In a case where the detection method concerning whether such a continuous proximity manipulation is performed is applied to the above-described display control process routine RT1, if a positive result is obtained in step SP1, the control section 20 starts measurement of the proximity time and detection of the movement trace of the manipulation body, and then moves the routine to step SP7.

Further, in step SP7, the control section 20 determines whether the proximity time reaches the proximity manipulation detection time in a state where at least one movement trace of the manipulation body is within the proximity manipulation detection range.

At this time, if a negative result is obtained in step SP7, this means that there is a possibility that the manipulation body mistakenly moves close to one of the first manipulation surface and the second manipulation surface or moves close to one of the first manipulation surface and the second manipulation surface for the touch manipulation.

Here, at this time, such a negative result merely means that if the manipulation body moves close to approximately the same position in one of the first manipulation surface and the second manipulation surface, the proximity time does not reach the continuous manipulation detection time. Accordingly, if a negative result is obtained in step SP7, the control section 20 returns the routine to step SP1.

Thus, while the manipulation body moves close to approximately the same position in one of the first manipulation surface and the second manipulation surface, the control section 20 sequentially repeatedly performs the processes of step SP1 and step SP7, and waits until the proximity time reaches the continuous manipulation detection time.

In this way, in a case where such a detection method is applied to the above-described display control process routine RT1, the control section 20 can also detect that the continuous proximity manipulation is performed for one of the first manipulation surface and the second manipulation surface.

[2-8. Eighth Modified Embodiment]

Further, in the above-described embodiment, if one touch area is detected as a touch area at the time when the touch is started in a state where the touch area is not detected at all, it is determined that the touch manipulation is started to detect whether the touch manipulation is performed.

However, the present invention is not limited thereto. For example, if one touch area is detected as a touch area at the time when the touch is started in a state where the touch area is not detected, it may be detected that the touch manipulation is performed according to the detection situation of the touch area thereafter, without determining the start of the touch manipulation.

Further, hereinafter, with respect to the detection method concerning whether such a touch manipulation is performed, a case where the manipulation body is close to the first manipulation surface of the first touch panel 14B will be described as an example.

That is, if one touch area is detected as a touch area at the time when the touch of the manipulation body is started in a state where the touch area is not detected at all, the control section 20 starts measurement of the touch time by the timer.

The control section 20 measures the touch time, from the time when the touch area is detected when the touch of the manipulation body is started, to the time when the touch area is detected when the touch of the manipulation body is terminated (from the time when the manipulation body is in touch with the first manipulation surface (the touch is started) to the time when the manipulation body is disengaged therefrom (the touch is terminated)). Further, during the measurement of the touch time, the control section 20 compares the touch time with the tap detection time.

Further, if one touch area is detected when the touch of the manipulation body is started in this way, the control section 20 also starts detection of the movement trace of the manipulation body using the center position of one touch area at the time when the touch is started as a starting point.

Further, if the detection of the movement trace of the manipulation body is started, whenever the control section 20 performs the area detection process thereafter to detect the touch area of the manipulation body and its center position to be traced, the control section 20 sequentially traces the detected center position from the starting point, to thereby detect the movement trace of the manipulation body.

Further, if the manipulation body is disengaged from the first manipulation surface and the measurement of the touch time is terminated before the touch time reaches the tap detection time, the control section 20 determines whether the movement trace detected thus far falls within the type detection circle centering on the starting point (center position).

As a result, if the movement trace which ranges from the time when the touch of the manipulation body for the first manipulation surface is started to the time when the touch thereof is terminated falls within the type detection circle, at this time, the control section 20 determines that the tap manipulation is performed as the touch manipulation for the first manipulation surface.

At this time, the control section 20 uses the center position (that is, the center position indicated by the coordinates of the pixel position) of the touch area at the time when the touch of the manipulation body through the tap manipulation is terminated, as a tap indication position indicated by the tap manipulation in an image displayed on the display surface of the first liquid crystal display panel 14A at this time.

Further, if the movement trace of the manipulation body disengaged from the first manipulation surface before the touch time reaches the tap detection time extends outside the type detection circle, at this time, the control section 20 determines that the tap manipulation as the touch manipulation is not performed on the first manipulation surface.

Further, if the touch time measured by the timer is beyond the tap detection time, the control section 20 determines whether the movement trace of the manipulation body extends outside the type detection circle.

As a result, if it is detected that the touch time is beyond the tap detection time and the movement trace of the manipulation body which is in touch with the first manipulation surface extends outside the type detection circle, at this time, the control section 20 determines that the sliding manipulation as the touch manipulation is performed on the first manipulation surface.

In this case, until the sliding manipulation is terminated after the sliding manipulation detection time, the control section 20 sequentially updates the movement trace of the manipulation body according to the detection of the center position. Further, the control section 20 uses the movement trace of the manipulation body through the sliding manipulation for image scrolling, for example.

Further, if the manipulation body is disengaged from the first manipulation surface in a state where the touch time is beyond the tap detection time and the movement trace of the manipulation body which is in touch with the first manipulation surface falls within the type detection circle, at this time, the control section 20 determines that the manipulation body is mistakenly in touch with the first manipulation surface and the touch manipulation is not performed.

In this way, the control section 20 can detect that the tap manipulation is performed using one finger which is an example of the manipulation body on the first manipulation surface of the first touch panel 14B, with such a detection method.

Further, the control section 20 can also detect that the sliding manipulation is performed using one finger which is the example of the manipulation body on the first manipulation surface of the first touch panel 14B.

[2-9. Ninth Modified Embodiment]

Further, in the above-described embodiment, the display control apparatus according to the present invention is applied to the mobile terminal 10 as described above with reference to FIGS. 1 to 23.

However, the present invention is not limited thereto. For example, the display control apparatus may be applied to a computer in which a touch panel and a display section such as a liquid crystal display panel are installed, or to an information processing apparatus such as a mobile phone, PDA (personal digital assistant), portable game player or the like.

Further, the present invention can be widely applied to a display control apparatus having a variety of configurations, for example, a photographing apparatus such as a digital still camera or digital video camera, a portable reproduction apparatus or the like.

[2-10.]Tenth Modified Embodiment

Further, in the above-described embodiment, a display control program according to the present invention is applied to the display control program stored in advance in the non-volatile memory 21 as described above with reference to FIGS. 1 to 23.

Further, the control section 20 performs the display control process routine RT1 as described above with reference to FIGS. 21 and 22 according to the display control program.

However, the present invention is not limited thereto. For example, the mobile terminal 10 may be installed with the display control program by a computer-readable storage medium in which the display control program is stored.

Further, the control section 20 may perform the display control process routine RT1 according to the installed display control program.

Further, the mobile terminal 10 may be installed with the display control program from the outside using a wired or wireless communication medium such as a local area network, the internet, digital satellite broadcasting or the like.

Further, the computer-readable storage medium for installing the display control program in the mobile terminal 10 to be in a performable state may be realized as a package media such as a flexible disc.

Further, the computer-readable storage medium for installing the display control program in the mobile terminal 10 to be in a performable state may be realized as a package media such as a CD-ROM (compact disc-read only memory).

Furthermore, the computer-readable storage medium for installing the display control program in the mobile terminal 10 to be in a performable state may be realized as a package media such as a DVD (digital versatile disc) or the like.

Further, the computer-readable storage medium may be realized as a semiconductor memory, a magnetic disk or the like in which a variety of programs is temporarily or permanently stored, in addition to the package media.

Further, as a means for storing the display control program in the computer-readable storage medium, a wired or wireless communication medium such as a local area network, the Internet, digital satellite broadcasting may be used.

Further, the display control program may be stored in the computer-readable storage medium through a variety of communication interfaces such as a router, modem or the like.

[2-11. Eleventh Modified Embodiment]

Further, in the above-described embodiment, the first liquid crystal display panel 14A and the second liquid crystal display panel 15A, as described above with reference to FIGS. 1 to 23, are used as the display section.

However, the present invention is not limited thereto. For example, a display section having a variety of configurations such as an organic EL (electro luminescence) display, a cathode-ray tube or the like, may be widely used as the display section.

[2-12. Twelfth Modified Embodiment]

Further, in the above-described embodiment, the electrostatic capacitance type of first touch panel 14B and second touch panel 15B, as described above with reference to FIGS. 1 to 23, are used as the detecting section for detecting the indication manipulation for the manipulation surface.

However, the present invention is not limited thereto. For example, a display section including a touch panel of an electrostatic capacitance type or a touch panel of a pressure-sensitive type which is installed integrally or separately to the display section may be used as the detecting section.

Further, in the above-described embodiment, a detecting section having a variety of configurations such as a touch screen formed by arranging an infrared emitting element and infrared sensing element for detecting the touch and proximity of the manipulation body in each pixel position of the liquid crystal display panel may be widely used as the detecting section.

[2-13. Thirteenth Modified Embodiment]

Further, in the above-described embodiment, the control section 20 including the CPU, as described above with reference to FIGS. 1 to 23, is used as a detecting section for detecting, if the indication manipulation for the manipulation surface is detected by the detecting section, the area indicated through the indication manipulation in the manipulation surface, and enlarging the image on the basis of the detected area to be displayed on the display section.

However, the present invention is not limited thereto. For example, as the detecting section, a microprocessor or a DSP (digital signal processor) may be used.

Further, in the present invention, as the detecting section, a control section having a variety of configurations such as a control circuit having a hardware circuit configuration for detecting, if the indication manipulation for the manipulation surface is detected by the detecting section, the area indicated through the indication manipulation in the manipulation surface, and enlarging the image on the basis of the detected area to be displayed on the display section, may be widely used.

[2-14. Fourteenth Modified Embodiment]

Further, in the above-described embodiment, the first liquid crystal display panel 14A and the second liquid crystal display panel 15A, as described above with reference to FIG. 1 to FIG. 23, are used as the original image display section for displaying an image.

However, the present invention is not limited thereto. For example, a display section having a variety of configurations such as an organic EL display, a cathode-ray tube or the like, may be widely used as the display section.

[2-15. Fifteenth Modified Embodiment]

Further, in the above-described embodiment, the liquid crystal display panel 14A and the second liquid crystal display panel 15A, as described above with reference to FIG. 1 to FIG. 23, are used as the enlarged image display section for displaying the enlarged image obtained by enlarging part of the image.

However, the present invention is not limited thereto. For example, a display section having a variety of configurations such as an organic EL display, a cathode-ray tube or the like, may be widely used as the display section.

The present application contains subject matter related to that disclosed in Japanese Priority Patent Application JP 2010-002132 filed in the Japan Patent Office on Jan. 7, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
   a display section;
   a detecting section which detects an indication manipulation for a manipulation surface;
   a control section which detects, if the indication manipulation for the manipulation surface is detected by the detecting section, an area in the manipulation surface indicated through the indication manipulation, and enlarges an image on the basis of the detected area to be displayed on the display section; and
   detects an enlargement target of the image on the basis of the detected area to be displayed on the display section,
   wherein the control section calculates boundaries of the enlargement target of the image on the basis of the detected area to be displayed on the display section,
   wherein a dimension ratio of the boundaries of the enlargement target corresponds to a size of the detected area,
   wherein the control section further detects a number of fingers that are manipulating the manipulation surface, enlarges the enlargement target at an enlargement ratio corresponding to the number of fingers that are detected, and enlarges the enlargement target at a smaller enlargement ratio when more fingers are detected.

2. The display control apparatus according to claim 1, wherein the control section detects, if the indication manipulation for the manipulation surface is detected by the detecting section, the enlargement target of the image on the basis of the indication manipulation, and enlarges part of the image which is the detected enlargement target on the basis of the area to be displayed on the display section.

3. The display control apparatus according to claim 2, wherein the control section detects, if a continuous indication manipulation for the manipulation surface is detected by the detecting section, change in the enlargement target on the basis of the continuous indication manipulation, and enlarges the part of the image which is the changed and detected enlargement target on the basis of the area to be displayed on the display section.

4. The display control apparatus according to claim 1, wherein the detecting section is integrally installed in the original image display section.

5. The display control apparatus according to claim 4, wherein the control section regularly detects, if the continuous indication manipulation for the manipulation surface is detected by the detecting section, the area in the manipulation surface indicated through the indication manipulation on the basis of the continuous indication manipulation, and enlarges the part of the image which is the enlargement target on the basis of the regularly detected area to be displayed on the display section.

6. The display control apparatus according to claim 5, wherein the control section enlarges the part of the image which is the enlargement target at the enlargement ratio according to the regularly detected area to be displayed on the display section.

7. The display control apparatus of claim 1, wherein the image and the enlarged image are displayed simultaneously.

8. The display control apparatus according to claim 1, wherein the display section further includes:

an original image display section which displays the image; and an enlarged image display section which displays an enlarged image obtained by enlarging the part of the image.

9. The display control apparatus according to claim 8, wherein both the display screens are touch screens.

10. The display control apparatus according to claim 1, wherein the dimension ratio of the boundaries of the enlargement target is larger when the size of the detected area is larger.

11. The display control apparatus according to claim 1, wherein the control section further detects a plurality of areas in the manipulation surface indicated through the indication manipulation.

12. The display control apparatus according to claim 1, wherein the control section further calculates the boundaries of the enlargement target of the image based on the detected plurality of areas in the manipulation surface indicated through the indication manipulation.

13. The display control apparatus according to claim 1, wherein the enlargement ratio further corresponds to a number of pixels detected of the enlargement target.

14. The display control apparatus according to claim 1, further comprising:

a computer-readable medium configured to store an information table indicating a corresponding relationship between the enlargement ratio and the size of the boundaries of the enlargement target.

15. The display control apparatus according to claim 1, wherein the control section further enlarges the enlargement target at the enlargement ratio in correspondence with a size of the boundaries of the enlargement target, and wherein the enlargement ratio is smaller when the size of the boundaries of the enlargement target becomes larger.

16. A display control method comprising the steps of:

detecting, by a processor, an indication manipulation for a manipulation surface and a number of fingers that are manipulating the manipulation surface;

detecting, if the indication manipulation for the manipulation surface is detected, an area in the manipulation surface indicated through the indication manipulation, and enlarging an image on the basis of the detected area to be displayed on a display section, detecting an enlargement target of the image on the basis of the detected area to be displayed on the display section, calculating boundaries of the enlargement target of the image on the basis of the detected area to be displayed on the display section, wherein a dimension ratio of the boundaries of the enlargement target corresponds to a size of the detected area, wherein the enlargement target is enlarged at an enlargement ratio corresponding to the number of fingers that are detected, and the enlargement target is enlarged at a smaller enlargement ratio when more fingers are detected.

17. The display control method of claim 16, where the method is embodied on a non- transitory computer readable medium, which causes the method to be executed in a computer.

* * * * *